US012543020B2

(12) United States Patent
Säily et al.

(10) Patent No.: US 12,543,020 B2
(45) Date of Patent: Feb. 3, 2026

(54) USE OF BACKSCATTER SIGNALS FOR POSITIONING WITHIN WIRELESS NETWORKS

(71) Applicant: Nokia Technologies Oy, Espoo (FI)

(72) Inventors: Mikko Säily, Espoo (FI); Sameera Palipana, Espoo (FI); Stephan Sigg, Espoo (FI); Si-Ahmed Naas, Espoo (FI)

(73) Assignee: Nokia Technologies Oy, Espoo (FI)

( * ) Notice: Subject to any disclaimer, the term of this patent is extended or adjusted under 35 U.S.C. 154(b) by 338 days.

(21) Appl. No.: 18/550,392

(22) PCT Filed: Mar. 22, 2021

(86) PCT No.: PCT/EP2021/057227
§ 371 (c)(1),
(2) Date: Sep. 13, 2023

(87) PCT Pub. No.: WO2022/199785
PCT Pub. Date: Sep. 29, 2022

(65) Prior Publication Data
US 2024/0179494 A1  May 30, 2024

(51) Int. Cl.
*H04W 4/029* (2018.01)
*H04B 1/69* (2011.01)
*H04L 5/00* (2006.01)

(52) U.S. Cl.
CPC .............. *H04W 4/029* (2018.02); *H04B 1/69* (2013.01); *H04L 5/0007* (2013.01)

(58) Field of Classification Search
CPC ......... H04W 4/029; H04B 1/69; H04L 5/0007
(Continued)

(56) References Cited

U.S. PATENT DOCUMENTS 6,380,894 B1   4/2002 Boyd et al.
7,009,561 B2   3/2006 Menache et al.
(Continued)

FOREIGN PATENT DOCUMENTS

WO   2005/091013 A1   9/2005
WO   2018/075653 A1   4/2018
(Continued)

OTHER PUBLICATIONS

"3rd Generation Partnership Project; Technical Specification Group Services and System Aspects; Service requirements for the 5G system; Stage 1 (Release 17)", 3GPP Ts 22.261, V17.2.0, Mar. 2020, 83 pages.
(Continued)

*Primary Examiner* — Don N Vo
(74) *Attorney, Agent, or Firm* — Barta Jones, PLLC

(57) ABSTRACT

A method includes controlling receiving, by a user device, frequency-shifted signals from a plurality of backscatter nodes for locating the user device, wherein each of the plurality of backscatter nodes is identifiable by a backscatter node-specific frequency offset of the frequency-shifted signals according to a configuration; determining, by the user device, phase information and a frequency offset for each of the received frequency-shifted signals; and controlling transmitting, by the user device to a network node that provides the configuration: the phase information and the frequency offset for each of the received frequency-shifted signals, for a positioning control entity to carry out the locating of the user device; or a location of the user device that is determined, by the user device, based on the phase information, the frequency offset for each of the received frequency-shifted signals and locations of the plurality of backscatter nodes known by the user device.

20 Claims, 11 Drawing Sheets

(58) Field of Classification Search
USPC ...................................................... 455/456.1
See application file for complete search history.

(56) References Cited

U.S. PATENT DOCUMENTS

| | | | |
|---|---|---|---|
| 10,944,612 B2* | 3/2021 | Hu | ...................... H04L 27/2657 |
| 11,533,206 B2* | 12/2022 | Lopez | ..................... H04L 27/04 |
| 2010/0109844 A1 | 5/2010 | Carrick et al. | |
| 2020/0018846 A1 | 1/2020 | Sundaresan et al. | |
| 2020/0052734 A1* | 2/2020 | Talla | ..................... H04B 1/1081 |
| 2020/0220641 A1* | 7/2020 | Suh | ....................... H03M 1/127 |
| 2021/0359754 A1* | 11/2021 | Talla | ........................ H04B 7/22 |

FOREIGN PATENT DOCUMENTS

| | | | |
|---|---|---|---|
| WO | 2019/108940 A1 | 6/2019 | |
| WO | 2019/158187 A1 | 8/2019 | |
| WO | 2020/180077 A1 | 9/2020 | |

OTHER PUBLICATIONS

Nandakumar et al., "3D Localization for Sub-Centimeter Sized Devices", Proceedings of the 16th ACM Conference on Embedded Networked Sensor Systems, Nov. 2018, pp. 108-119.

Schmidt, "Multiple emitter location and signal parameter estimation", IEEE Transactions on Antennas and Propagation, vol. 34, No. 3, Mar. 1986, pp. 276-280.

International Search Report and Written Opinion received for corresponding Patent Cooperation Treaty Application No. PCT/EP2021/057227, dated Dec. 23, 2021, 13 pages.

* cited by examiner

USE OF BACKSCATTER SIGNALS FOR POSITIONING WITHIN WIRELESS NETWORKS

RELATED APPLICATION

This application was originally filed as PCT Application No. PCT/EP2021/057227, filed on Mar. 22, 2021, of which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: controlling receiving, by a user device, frequency-shifted signals from a plurality of backscatter nodes for locating the user device, wherein each of the plurality of backscatter nodes is identifiable by a backscatter node-specific frequency offset of the frequency-shifted signals according to a configuration; determining, by the user device, phase information and a frequency offset for each of the received frequency-shifted signals; and controlling transmitting, by the user device to a network node that provides the configuration: the phase information and the frequency offset for each of the received frequency-shifted signals, for a positioning control entity to carry out the locating of the user device based on the phase information, the frequency offset for each of the received frequency-shifted signals and locations of the plurality of backscatter nodes known by the positioning control entity; or a location of the user device that is determined, by the user device, based on the phase information, the frequency offset for each of the received frequency-shifted signals and locations of the plurality of backscatter nodes known by the user device.

According to an example embodiment, a method may include: controlling transmitting, by a network node to a plurality of backscatter nodes, the locations of which are known, configuration information comprising backscatter node-specific frequency offsets for the plurality of backscatter nodes, wherein each of the backscatter nodes is identifiable by a backscatter node-specific frequency offset; controlling receiving, by the network node from a positioning control entity, a location request for one or more user devices; controlling transmitting, by the network node, a signal to at least some of the plurality of backscatter nodes for the signal to be frequency shifted by a backscatter node-frequency offset according to the configuration information and transmitted by the at least some of the plurality of backscatter nodes to one or more user devices; and controlling receiving, by the network node from a user device: the phase information and the frequency offset for each of the received frequency-shifted signals, for a positioning control entity to carry out the locating of the user device based on the phase information, the frequency offset for each of the received frequency-shifted signals and locations of the plurality of backscatter nodes known by the positioning control entity; or a location of the user device that is determined, by the user device, based on the phase information, the frequency offset for each of the received frequency-shifted signals and locations of the plurality of backscatter nodes known by the user device; controlling transmitting, by the network node to the positioning control entity, at least one of the following: the phase information and the frequency offset, received by the network node and determined by the user device, for each of the plurality of received frequency-shifted signals; or the location of the user device, received by the network node and determined by the user device based on the phase information and frequency offset of the plurality of received backscatter signals and locations of the backscatter nodes known by the user device.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
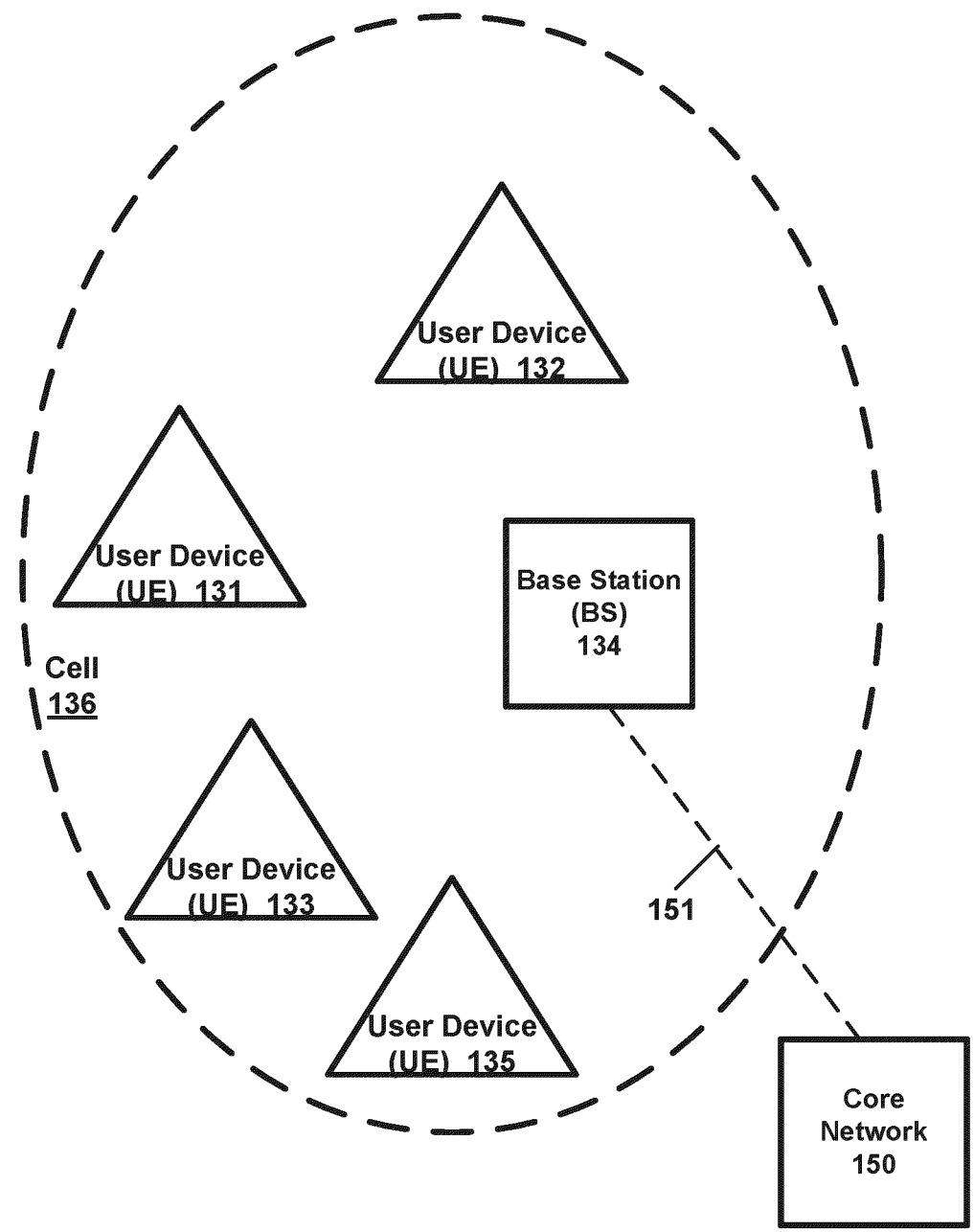
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The techniques described herein may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

In some cases, a UE positioning procedure may be used to determine a location or geographic position of a UE (or mobile device) or of an asset that is being tracked. In some examples, UE positioning may be performed or determined based on positioning reference signals (PRSs). Some example positioning procedures may include Time Difference of Arrival (TDOA), such as downlink-TDOA (DL-TDOA), DL (downlink) Angle of Departure (DL-AoD), UL (uplink) Angle of Arrival (AoA), multi-cell round trip time (MC-RTT) positioning, or other positioning or location techniques. Applications or use cases may exist or arise where the network may track a location of a UE(s) or asset. As part of a positioning procedure, a UE, or other device, may measure and report measured signal parameter(s) of reference signals (e.g., DL PRS signals), to allow a network to track the UE's (and thus the asset's) location (or position). There may exist applications or uses where it may be useful to track a (e.g., geographic) position of an asset, such as tracking a position of a valuable object, tracking a package or container shipment, employee badge tracking, etc.

Due to the increasing number of wirelessly connected devices or gadgets (e.g., such as due to the Internet-of-Things (IoT) paradigm), new energy efficient communication techniques and devices are being developed. According to an example implementation, ambient backscatter communications may be used as a low power communication technique in which a backscatter node (which may also be referred to as a backscatter tag or backscatter device) may receive an ambient (or surrounding) wireless signal (e.g., that may have been transmitted to another wireless device), and then may reflect the received ambient signal. For example, backscatter communications may take advantage of existing or surrounding wireless signals by reflecting the ambient or existing wireless signal(s) to communicate between devices while using very little power. Thus, for example, ambient (or surrounding) wireless signals may be repurposed into both a source of power (e.g., to power one or more electronic devices on a wireless sensor node or wireless backscatter device) and a communication medium. According to an example embodiment, ambient backscatter communication may allow a backscatter node to reflect a received ambient signal while modulating data onto the reflected signal. For example, the reflected backscatter signal may be modulated using active (or switched) load modulation in which the load of the antenna (of the transmitting backscatter device) is varied or changed, which may allow different data values (e.g., different phases) to be applied to the reflected signal, e.g., such as either an in-phase bit or signal, or an out-of-phase bit or signal (in the simple case of a bi-polar signal), depending on the load applied to the antenna.

Global positioning system (GPS) is the dominant technology for locating outdoor devices, users etc. The reason for this success is that the localization targets passively listen to time synchronized signals emitted from several satellites. The localization targets do not transmit any signal and only process the signals received from multiple satellites. This makes the system energy efficient from the localization target's perspective. The system is scalable to an infinite number of localization targets (GPS receivers) as long as they are in the vicinity of the signals from at least three satellites. However, GPS is known to suffer from low accuracy in urban densely populated areas and indoors due to signal blockages, multipath propagation and non-line-of-sight effects.

New applications may require indoor asset tracking systems to provide accurate indoor asset or device tracking, which may not be suitable for GPS tracking. Asset tracking applications may require tracking of device or asset tracking for machinery and devices in shop floors, bin tracking, product tracking and person tracking, for example. The required positioning accuracy for mobile objects in a factory floor may be, for example, smaller than about 50 cm according to 3GPP TS. In some example cases, a typical indoor positioning system may require at least three base stations (BSs or gNBs) to perform a trilateration at the receiver node using methods like time of arrival (ToA), time difference of arrival (TDoA), angle of arrival (AoA), angle of departure (AoD) or reference signal received power (RSRP) or signal strength-based methods. At least for some applications, a backscatter communication system may be preferred for asset or device tracking (e.g., instead of active transmission via cellular networks) to improve energy efficiency, decrease device costs, and reduce human intervention or maintenance (e.g., such as changing batteries for devices or UEs being tracked).

The techniques described here may use a backscatter communication system as the underlying infrastructure for positioning UEs, mobile devices or assets. A backscatter communication system may include a radio frequency (RF) (or wireless signal) source, a backscatter transmitter and a backscatter receiver. The RF (or wireless signal) source emits RF (or wireless) signals to activate a backscatter node functioning as a backscatter transmitter. Then, the backscatter transmitter modulates and reflects the incoming RF signals to the tag operating as the backscatter receiver rather than self-generating the RF (or wireless) signals. As the backscatter transmitter operates in a passive communication mode by simply modulating and reflecting the incoming RF or wireless energy, the energy consumption (or amount of power required by backscatter transmitter to modulate and reflect the received signal) may be very low which is the main benefit of this configuration.

For example, a backscatter communication system may function in two main configurations: monostatic and bistatic. In a monostatic configuration, the RF (or ambient wireless signal) source and the backscatter receiver are (or may be) collocated. The backscatter transmitter is (or may be) physically separated. This is the most common configuration found in radio frequency identification (RFID) backscatter systems. In a bistatic configuration, the RF source, backscatter transmitter and backscatter receiver are at different physical locations. This configuration can use either a dedicated RF source for active transmission or an already existing ambient source such as a cellular base station, television tower, WiFi or other wireless signal source.

A backscatter transmitter may be configured to reflect the incoming signals from an RF (or wireless signal) source through impedance mismatching. This is achieved by alternating the antenna impedance to switch between absorbing and reflection states via load modulation which causes the reflected signal's envelope to have different amplitude levels. This allows the backscatter transmitter to modulate information bits to the reflected signal. The backscatter receiver interprets the absorbing and reflecting states as modulations of different information bits. During the reflection operation, the backscatter transmitter can change both the amplitude and phase of the incoming signal. To change the frequency of the reflected signal the backscatter tag needs to change the reflection coefficient to approximate a sinusoid. The sinusoid represents a single tone signal which then shifts the frequency of the incoming signal. The main advantage of using a backscatter node (or backscatter tag) for backscatter communication (e.g., backscatter modulation and reflection) is the energy efficiency and low cost compared to active transmitters. The backscatter nodes or backscatter tags do not contain energy consuming oscillators, can be charged through received RF or wireless signals, and can go to sleep mode to save the energy. Thus, backscatter communications may advantageously be used for UE, mobile device or asset tracking.

Figure 2:
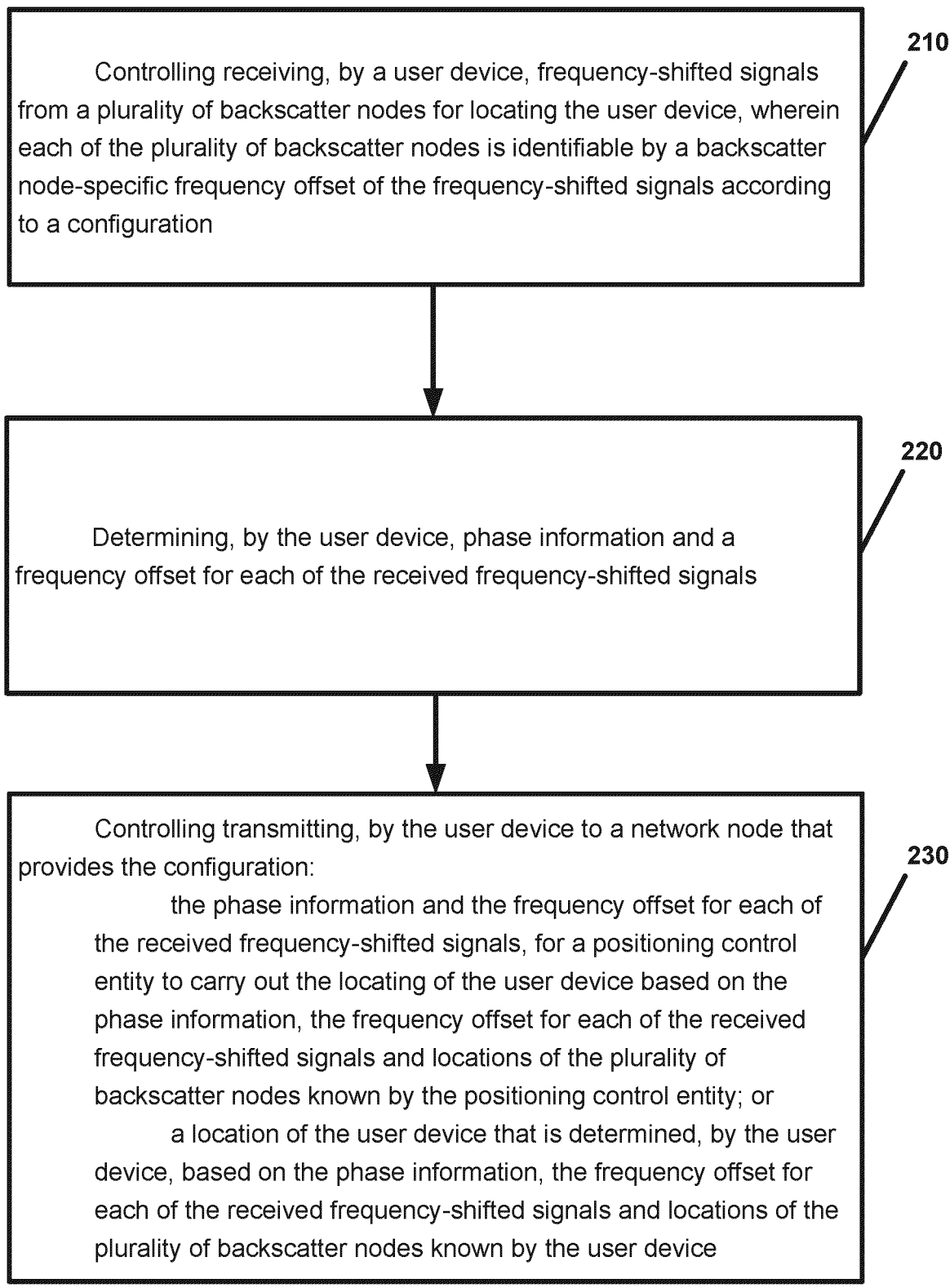
FIG. 2 is a flow chart illustrating operation of a user device (or UE).

FIG. 2 is a flow chart illustrating operation of a user device (or UE). Operation 210 includes 1 controlling receiving, by a user device (e.g., UE), frequency-shifted (e.g., backscatter) signals from a plurality of backscatter nodes for locating the user device, wherein each of the plurality of backscatter nodes is identifiable by a backscatter node-specific frequency offset of the frequency-shifted signals according to a configuration. Operation 220 includes determining, by the user device, phase information and a frequency offset for each of the received frequency-shifted signals. Operation 330 includes controlling transmitting, by the user device to a network node (e.g., BS, gNB, eNB, AP, CU, DU, or other network node) that provides the configuration (the network node may provide the configuration to one or more nodes or user devices): the phase information and the frequency offset for each of the received frequency-shifted signals, for a positioning control entity (e.g., such as a location management function (LMF)) to carry out the locating of the user device based on the phase information, the frequency offset for each of the received frequency-shifted (e.g., backscatter) signals and locations of the plurality of backscatter nodes known by the positioning control entity; or a location of the user device that is determined, by the user device, based on the phase information, the frequency offset for each of the received frequency-shifted signals and locations of the plurality of backscatter nodes known by the user device.

For example, at least one of the user device (UE) or the positioning control entity (e.g., LMF) will know the locations (also referred to as positions) of the backscatter nodes, depending on which of these nodes/entities determines a location of the user device. If the UE determines its location based on phase information and frequency offset of the received backscatter signals, then at least the UE will know the locations of the backscatter nodes (e.g., because the UE will determine its location based on the phase information and frequency offsets of the backscatter signals, and known locations of the backscatter nodes). On the other hand, if the positioning control entity (e.g., LMF, or network node) determines a location of the UE, then at least the positioning control entity will know the locations of the backscatter nodes (e.g., because the positioning control entity will determine the location of the UE based on the phase information and frequency offsets of the backscatter signals, and known locations of the backscatter nodes). Thus, in such case where the positioning control entity determines the UE's location, the user device/UE may not necessarily know the locations of the backscatter nodes.

With respect to the method or flow chart of FIG. 2, a backscatter node-specific frequency offset is associated with or assigned to each of the backscatter nodes such that a backscatter node that transmitted a frequency-shifted (e.g., backscatter) signal is identifiable based on a frequency offset of the transmitted (and received) frequency-shifted (backscatter) signal. For example, a different frequency offset may be assigned to each of the plurality of backscatter nodes. Each backscatter node may then frequency shift by its assigned backscatter node-frequency offset and transmit (reflect) a received signal. The frequency shifted (backscatter) signals may be received by one or more nodes, such as by a UE(s). A UE may receive many backscatter signals, from different backscatter nodes. The UE may determine phase information and the frequency (or frequency offset) of each of the received frequency-shifted (backscatter) signals. Each frequency-shifted (backscatter) signal (each backscatter node may transmit a backscatter signal at a different frequency or frequency offset) may be received at a particular frequency or frequency offset (with respect to a base or initial frequency). The backscatter node that transmitted each received backscatter signal is identifiable based on the frequency offset of the received frequency shifted backscatter signal. The receiving node (e.g., UE) may determine phase information and frequency offset for each received frequency shifted (backscatter) signal. In a case where the UE determines its own location (or position), the UE may then determine its location based on phase information and frequency offset of each of a plurality of backscatter signals, and locations of backscatter nodes that are known to the UE. If another node (e.g., gNB or a positioning control entity, such as a LMF) is determining or calculating the UE location, then the locations of the backscatter node are not necessarily known by the UE, but would be known by the positioning control entity or LMF. Thus, either the UE determines its location and forwards its location to the network node (based on phase information, frequency offset of backscatter signals and locations of the backscatter nodes known by the UE, and configuration information that assigned a frequency offset to each of the backscatter nodes), or the UE sends the phase information and frequency offset for each of the plurality of received backscatter signals (received by the UE) to the network node, to allow the network node or a positioning control entity (e.g. LMF) to calculate the location of the UE (based on phase information and frequency offset measured by the UE for each of the backscatter signals and positions of the backscatter nodes known by the positioning control entity, and configuration information that assigned a frequency offset to each of the backscatter nodes). The positioning control entity may be provided at the network node, or at another node, e.g., within a core network, within the cloud or network, or provided at another location, and may be, for example, a location management function (LMF).

With respect to the method or flow chart of FIG. 2, each of the frequency-shifted signals may include a backscatter signal, which may include one of the following: an orthogonal frequency division multiplexing (OFDM) signal reflected by a backscatter node in which a frequency has been shifted by a backscatter node-specific frequency offset associated with or assigned to the backscatter node; or a chirp spread spectrum signal, including at least one of a downchirp signal or an upchirp signal, reflected by a backscatter node in which a frequency has been shifted by a backscatter node-specific frequency offset associated with or assigned to the backscatter node.

With respect to the method or flow chart of FIG. 2, the determining, by the user device (UE), phase information and a frequency offset for each of the received frequency-shifted signals may include performing at least one of: performing, by the user device, a correlation on the received frequency-shifted signals to detect a peak amplitude that is greater than a threshold and a phase, for one or more of the backscatter node-specific frequency offsets; or performing, by the user device, a correlation on the received frequency-shifted signals to detect a peak amplitude that is greater than a threshold and a phase of each of a plurality of user device antenna elements, for one or more of the backscatter node-specific frequency offsets.

With respect to the method or flow chart of FIG. 2, the controlling transmitting may include: controlling transmitting, by the user device (UE) to a network node that provides the configuration, the phase information and the frequency offset for each of the received frequency-shifted signals, for a positioning control entity (e.g., LMF) to carry out the locating of the user device based on the phase information, the frequency offset for each of the received frequency-shifted signals and locations of the plurality of backscatter nodes known by the positioning control entity. Thus, in this example, the UE may not know the locations of the backscatter nodes, as the positioning control entity determines the location of the UE (and the positioning control entity possibly determines locations of multiple UEs).

With respect to the method or flow chart of FIG. 2, the method may further include determining, by the user device, a location of the user device, based on the phase information, the frequency offset for each of the received frequency-shifted signals and locations of the plurality of backscatter nodes known by the user device; wherein the controlling transmitting comprises: controlling transmitting, by the user device to a network node that provides the configuration, the location of the user device that is determined by the user device. In this example, the user device (UE) determines its location based on phase information and frequency offsets of the received frequency-shifted (e.g., backscatter) signals, and locations of the backscatter nodes known by the UE.

With respect to the method or flow chart of FIG. 2, the configuration may include a location measurement configuration (or other configuration information), the method may further include: controlling receiving, by the user device (UE) from the network node, the location measurement configuration including at least a backscatter node-specific frequency offset of a frequency-shifted signal for each of the plurality of backscatter nodes, and a location of each of the plurality of backscatter nodes.

With respect to the method or flow chart of FIG. 2, the location measurement configuration (or other configuration information) may include information indicating: a location of each of the backscatter nodes; a different backscatter node-specific frequency offset assigned to each of the plurality of backscatter nodes; and an indication of a positioning procedure or one or more parameters for the positioning procedure, to be used by the user device to determine a location of the user device.

With respect to the method or flow chart of FIG. 2, the method may further include receiving, by the user device from the network node, a wakeup signal; and transitioning, in response to receiving the wakeup signal, by the user device from a low power state to a full power state in order to receive the plurality of backscatter signals.

Figure 3A:
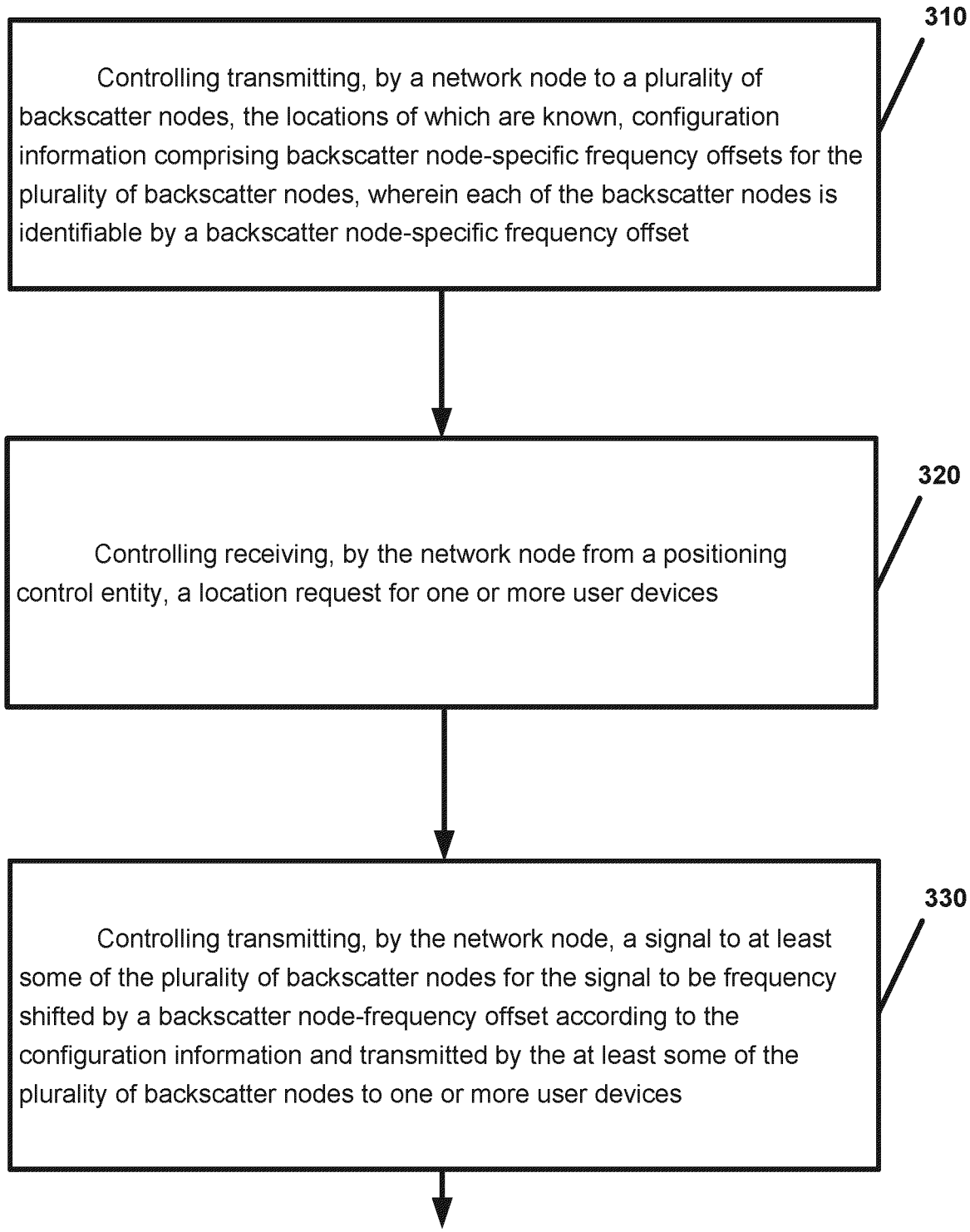
FIGS. 3A-3B is a flow chart illustrating operation of a network node (e.g., BS, gNB, DU, or other network node).
Figure 3B:
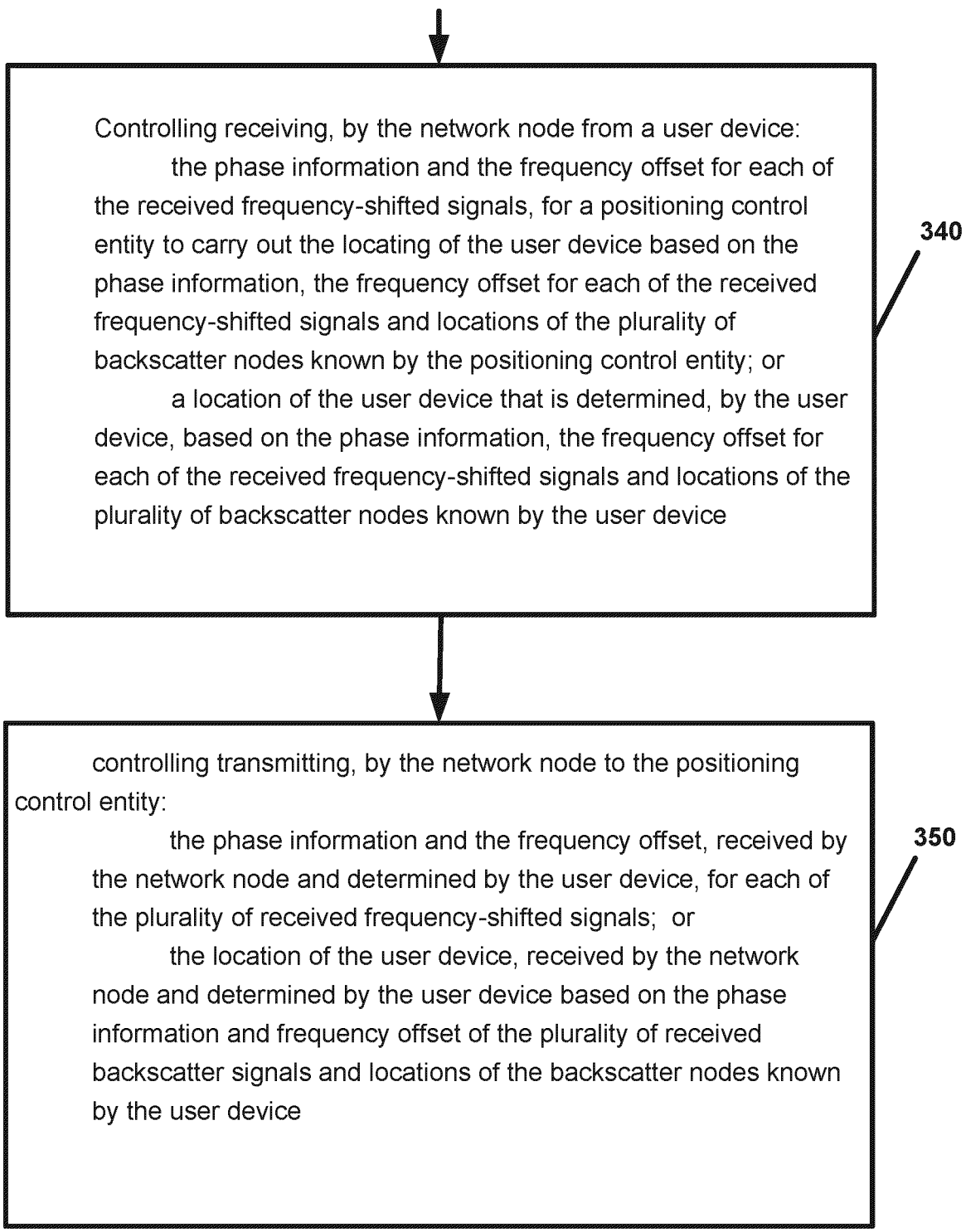

FIGS. 3A-3B is a flow chart illustrating operation of a network node (e.g., BS, gNB, eNB, CU, DU, . . . or other network node). Operation 310 includes controlling transmitting, by a network node to a plurality of backscatter nodes, the locations of which are known, configuration information comprising backscatter node-specific frequency offsets for the plurality of backscatter nodes, wherein each of the backscatter nodes is identifiable by a backscatter node-specific frequency offset. Operation 320 includes controlling receiving, by the network node from a positioning control entity, a location request for one or more user devices. Operation 330 includes controlling transmitting, by the network node, a signal to at least some of the plurality of backscatter nodes for the signal to be frequency shifted by a backscatter node-frequency offset according to the configuration information and transmitted by the at least some of the plurality of backscatter nodes to one or more user devices. Operation 340 includes controlling receiving, by the network node from a user device: the phase information and the frequency offset for each of the received frequency-shifted signals, for a positioning control entity to carry out the locating of the user device based on the phase information, the frequency offset for each of the received frequency-shifted signals and locations of the plurality of backscatter nodes known by the positioning control entity; or a location of the user device that is determined, by the user device, based on the phase information, the frequency offset for each of the received frequency-shifted signals and locations of the plurality of backscatter nodes known by the user device. Operation 350 includes controlling transmitting, by the network node to the positioning control entity: the phase information and the frequency offset, received by the network node and determined by the user device, for each of the plurality of received frequency-shifted signals; or the location of the user device, received by the network node and determined by the user device based on the phase information and frequency offset of the plurality of received backscatter signals and locations of the backscatter nodes known by the user device.

With respect to the method or flow chart of FIGS. 3A-3B, the controlling transmitting a wireless signal may include: controlling transmitting, by the network node, a signal to be reflected and frequency shifted, by a backscatter node-specific frequency offset, by each of the plurality of the backscatter nodes.

With respect to the method or flow chart of FIGS. 3A-3B, the configuration information may include a location measurement configuration (or other configuration information) indicating: a location of each of the backscatter nodes; a different backscatter node-specific frequency offset assigned to each of the plurality of backscatter nodes; and an indication of a positioning procedure or one or more parameters for the positioning procedure, to be used by the user device to determine a location of the user device.

With respect to the method or flow chart of FIGS. 3A-3B, the controlling transmitting, by the network node, a signal to at least some of the plurality of backscatter nodes may include controlling transmitting at least one of the following: an orthogonal frequency division multiplexing (OFDM) signal; or a chirp spread spectrum signal, including at least one of a downchirp signal or an upchirp signal.

Further illustrative details, features and/or examples for the methods described in the flow charts of FIGS. 2, 3A, 3B are described hereinbelow and with reference to FIGS. 4-12. The terms location and position may be used interchangeably, and may refer to a location of any object, such as a location of a mobile node (e.g., UE or user device, or other mobile node), a backscatter node, an asset or other object, such as a location that may be indicated by X, Y coordinates, GPS coordinates, or other location in one or more location coordinate systems.

Figure 4:
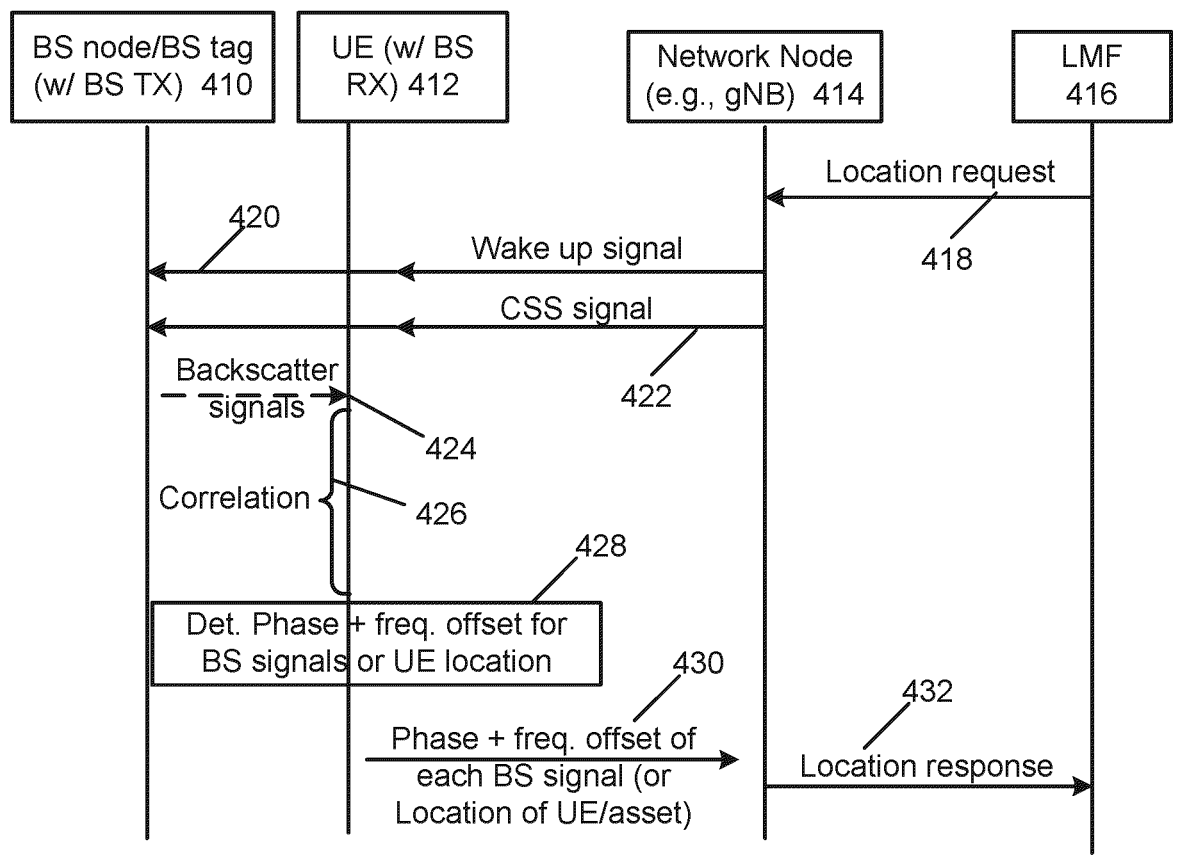
FIG. 4 is a diagram illustrating operations and/or signaling that may be performed for the methods described with reference to FIGS. 2, 3A, 3B.

FIG. 4 is a diagram illustrating operations and/or signaling that may be performed for the methods described with reference to FIGS. 2, 3A, 3B. A backscatter communication system, e.g., as shown in FIG. 4, may, for example, be provided in a bistatic configuration, and may include a network node (e.g., BS, gNB, DU) 414 as an RF (or ambient wireless signal) source that generates a signal, one or more backscatter nodes (or backscatter tags, each including a backscatter transmitter) (such as backscatter node 410) with known locations geographically distributed within and/or around the area of interest (e.g., within one or more cells, near UEs), and backscatter receivers attached to target assets that may be in unknown locations. Initially the backscatter transmitters and receivers may be in a sleeping or low power state to save energy. The RF source may include or may send a wake-up signal using a preamble code. The backscatter transmitters and receivers wake up by receiving this signal. The RF source may then emit or transmit a signal, such as an orthogonal frequency division multiplexing (OFDM) signal or a chirp spread spectrum signal (CSS) and the backscatter transmitters shift the frequency (by a frequency offset assigned to or associated with the backscatter transmitter) and reflect the incoming signal. The shifted (or offset) frequency may be unique to (or may be assigned to, or may be associated with) each backscatter transmitter, and thus, may be used as an identifier of the transmitter (to allow a receiver to identify the transmitting backscatter node based on a frequency offset or frequency shift of the received backscatter signal). The receiver may perform correlation-based RF signal processing for each antenna to determine the phase of the signal and the correlation peak occurs at the shifted (or offset) frequency. The phase and the corresponding frequency offsets corresponding to each backscatter transmitter for each backscatter receiver antenna may be transmitted to a network node (e.g., base station (BS), gNB, DU, or other network node) to compute the location of the asset using a direction of arrival based trilateration technique which will be forwarded to an asset management database at LMF. Location information of each backscatter transmitter is also maintained along with the frequency shift as the unique identifier of the backscatter transmitter. This information is then used for computing the location coordinates of each asset collocated with a backscatter receiver using a direction of arrival-based location estimation technique.

Figure 7:
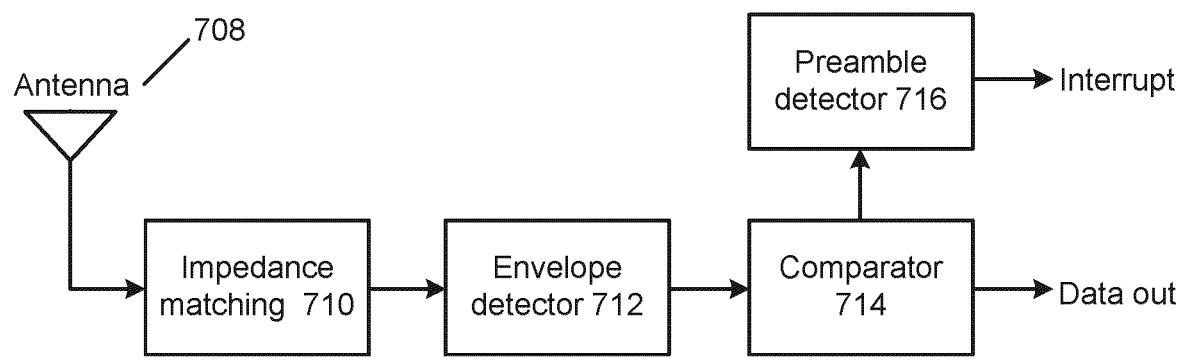
FIG. 7 is a diagram illustrating an example of a wake-up receiver or wake-up radio.

As shown in FIG. 4, UE 412 may include a backscatter (BS) receiver (BS RX) to receive backscatter signals, and may be co-located (or attached to or provided at the same location as) with an asset to be tracked. An example of a backscatter receiver, which may be attached to a UE (or provided with a UE), is shown in FIG. 7. According to illustrative examples, systems are described that may allow tracking or determining a location or position of a UE (such as UE 412). Also, by tracking or determining a location of a UE 412, this may also allow tracking and determining a location of an asset that may be co-located with (e.g., attached to) the UE 412. UE 412 may be in communication with a network node, e.g., gNB 414. The network node may include a gNB, base station (BS), DU, or other network node, and is shown in FIG. 4 as a gNB 414. gNB 414 may be in communication with a position control entity, such as (for example) a location management function (LMF) 416. LMF 416, or other position control entity, may be involved or participate in, and in some cases, may even perform and/or control, determining or calculating a location or position of various mobile nodes, such as UE 412 and possibly other UEs or mobile nodes and/or assets. Also, in FIG. 4, a backscatter node 410 (which may also be referred to as a backscatter tag or a tag) may include at least a backscatter transmitter (BS TX) to perform a frequency shift (e.g., by shifting a frequency of a received signal by a frequency offset associated with the backscatter node or backscatter tag) and reflect a received signal. Backscatter nodes (or backscatter tags) may also be referred to as anchor nodes, and may be provided at known locations within a cell and/or provided at various locations within a geographic area covered by a wireless network.

Referring to FIG. 4, at 418, the LMF 416 may send a location request to gNB 414 to request a location of one or more UEs (or assets) or information or measurements upon which the LMF may determine a location of the one or more UEs, such as for UE 412. At 420, gNB 414 may send a wakeup signal and a preamble (e.g., for synchronization) to UE 412 (which may be in an inactive or low power state) and/or to backscatter node(s) (or backscatter tag(s)) including backscatter node 410, which may be in a low power or sleep state. The wakeup signal may wakeup the UE 412 and/or backscatter node 410 (e.g., causing these nodes to transition to a low power state or sleep state, or to a full power operational state). At 422, as part of a positioning procedure, to allow locations of various UEs or assets to be determined, the gNB 414 may transmit a signal, such as an OFDM signal or a chirp spread spectrum signal (CSS), which may be received by one or more backscatter nodes or backscatter tags (e.g., provided at known locations), such as backscatter node 410. For example, a backscatter tag may be or may include a passive wireless transmitter that may receive, frequency shift, modulate and reflect a received signal.

At 424, backscatter node (or tag) 410 (which may include a backscatter transmitter) may frequency shift (by a frequency offset assigned to or associated with the backscatter node 410) and reflect the received signal, to thereby transmit a reflected backscatter signal, which may be received by various UEs, such as by UE 412.

At 426, UE 412 may perform correlation for the received backscatter signals, to determine phase information (e.g., a phase) and frequency offset of each received backscatter signal, for example. UE 412, for example, may include one or more antennas, e.g., as part of an antenna system or antenna array. For example, for each of one or more antennas, UE 412 may perform a correlation on the received backscatter signals to detect a peak amplitude and a phase, for each channel or frequency offset. Each different frequency offset or channel may be associated with (or may be used to identify) a backscatter node or tag that transmitted a backscatter signal. As noted, each backscatter node may be assigned a backscatter node-specific frequency offset. And, thus, each backscatter node (e.g., that transmitted a frequency shifted (backscatter) signal) is identifiable based on a frequency or frequency offset of the received backscatter signal. Thus, at 428, UE 412 (e.g., which may include a backscatter receiver) may determine a phase and frequency offset for one or more received backscatter signals, for each of one or more antennas, e.g., based on correlation. For example, UE 412 may receive backscatter signals from multiple or many (e.g., 2, 3, 4, 5, 6, . . . ) backscatter nodes (or backscatter tags), and may perform correlation, at various frequency offsets, to detect a phase and peak amplitude (above a threshold) for one or more received backscatter signals from various backscatter nodes or tags.

At 430, UE 412 may transmit to gNB 414 the determined phase and frequency offset (which identifies the backscatter node or tag that transmitted the backscatter signal that was received and correlated by the UE 412) for one or more backscatter signals, e.g., for one or more antennas of the UE 412.

At 432, the network node or gNB 414 may determine a location of one or more of the UEs or assets (such as a location of UE 412), using a triangulation positioning method or technique, e.g., based on the phases and frequency offsets received by gNB 414 from one or more UEs (such as from UE 412). At 432, gNB 414 may send a location response to LMF 416.

Alternatively, at 430, rather than UE 412 transmitting a message to gNB 414 that indicates a phase and a frequency offset for one or more received backscatter signals (e.g., for one or more antennas of UE 412), the UE 412 may determine its location based on the determined phase and frequency offsets for the one or more backscatter signals and locations of backscatter nodes known by the UE 412, and then the UE 412 may send a message at 430 to gNB 414 indicating its location (e.g., X, Y coordinates, GPS coordinates, or other location information indicating a location of UE 412).

The UE 412 may use Discontinuous Reception (DRX) in RRC_IDLE and RRC_INACTIVE state in order to reduce power consumption. When the base station needs to wake up the UE, Multiplexed SSS (secondary synchronization signals)-only wake-up (power-saving) signals can be used before transmitting the SSB (synchronization signaling block) for paging indication. When no UE is to be paged, normal secondary synchronization signal (SSS) may be transmitted for enhancement of synchronization, radio resource management (RRM), and automatic gain control (AGC) tuning.

Figure 5:
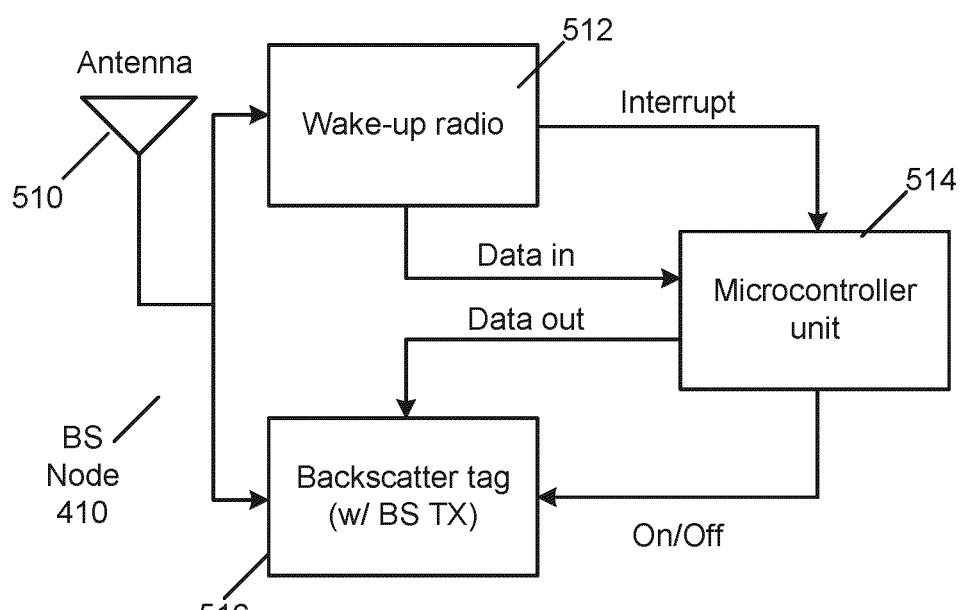
FIG. 5 is a block diagram illustrating an example of a backscatter node (e.g., backscatter tag).

FIG. 5 is a block diagram illustrating an example of a backscatter node (e.g., backscatter tag). Backscatter node 410 may include an antenna 510, a wake-up radio 512, a microcontroller unit 514, and a backscatter tag (including a backscatter transmitter) 516. FIG. 5 illustrates how a wake-up signal may be used to wake up and configure a backscatter node or backscatter tag. The backscatter tag (or backscatter transmitter) 516 and the wake-up radio 512 use the same frequency; hence, they share the same antenna. First, the wake-up radio 512 may detect a preamble signal from the network node or gNB 414, and decode the configuration information in the signal. When it detects the wake-up signal in the packet, an interrupt is sent to the microcontroller unit 514 to wake up the backscatter tag 516. The configuration information may include, for example, the address of the backscatter tag 516, and the frequency offset or frequency shift that is assigned to the backscatter tag 516. This configuration information may also be sent to the microcontroller unit 514 through the data channel (data in), shown in FIG. 5. When the network node or gNB 414 wants to wake up all (or many of) the backscatter tags, the gNB 414 may use a broadcast-based wake-up (e.g., may broadcast a wake-up signal to all tags or backscatter nodes). If gNB 414 wants to wake up a subset of the tags or a particular tag, the gNB 414 may use an address-based wake-up signal(s). Waking up a neighborhood of tags is performed to enable only the selected backscatter tags or backscatter nodes. Single tag waking up may be performed to configure the tag such as the frequency offset or frequency shift assigned to the backscatter tag or backscatter node. The wake-up radio may always be powered (in an on or operational state) and waits for the wake-up signal. Microcontroller unit 514 may be provided in a low power or sleep state, until receiving an interrupt from the wake-up radio 512.

In some cases, to further reduce power consumption, the wake-up radio 512 may be duty cycled, e.g., where the wake-up radio 512 alternates between an operational or listen state and sleep (or low power) state periodically. During the listen (e.g., operational or powered on) state, the wake-up radio 512 monitors the channel for a wake-up signal. As a solution for the loss of signal during the sleeping period, the base station must send the wake up signal several times until an acknowledgement is received.

Figure 6:
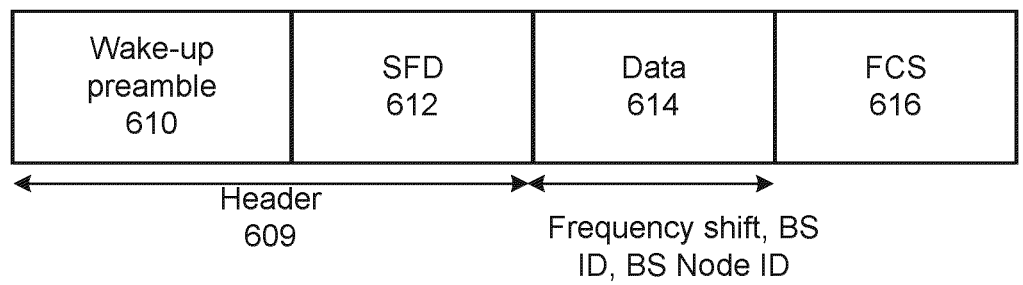
FIG. 6 is a diagram illustrating a packet of a wake-up signal that may be transmitted by a network node (e.g., BS, gNB, DU).

FIG. 6 is a diagram illustrating a packet of a wake-up signal that may be transmitted by a network node (e.g., BS, gNB, DU). The wakeup (and configuration) packet 608 may include a packet header 609 data 614, and a frame check sequence (FCS) 616. The packet header 609 may include a wake-up preamble 610 and a start frame delimiter (SFD) 612. The preamble 610 allows the transmitter and receiver to synchronize the bit intervals and the SFD 612 indicates the start of the data field (614) of the packet 608. The data field 614 may indicate or include a configuration, e.g., such as indicating a network node or gNB ID to identify the gNB, base station or network node that is transmitting the packet 608, a backscatter node ID (BS node ID or tag ID), and a frequency offset (frequency shift) that is being assigned to the backscatter node or backscatter tag. A neighborhood or group ID (identifier) may be included, if the wakeup packet is directed to a group of backscatter nodes or all backscatter nodes. If there is no ID in the packet, this may indicate a broadcast-based wake-up. Finally, to correct any errors in the packet due to effects of the channel, a frame check sequence (FCS) 616 based on cyclic redundancy check may be implemented. Also, for example, a network node (e.g., base station (BS) or gNB or DU) that acts as the wake-up transmitter may modulate a wake-up signal (e.g., wake-up packet 608) using on-off-keying (OOK). In OOK modulation, for example, the preamble signal information may be transmitted using '0's and '1's. When the base station sends a '1', it emits a large carrier amplitude and when a '0' is sent, the transmitter is turned off. This modulation technique may reduce the energy consumption of the network node (gNB or base station) as it saves the transmit power on sending '0's. At the receiver end, the OOK signal is detected from a rising edge of the digital signal indicating a transition of low to high that is interpreted as a valid signal has been received. FIG. 5 illustrates a wake-up receiver implementing this approach.

FIG. 7 is a diagram illustrating an example of a wake-up receiver or wake-up radio. The wake-up radio (or wake-up receiver) shown in FIG. 7 may include an impedance matching circuit 710 to transfer a maximum power from the antenna 708, an envelope detector 712 functions as a demodulator of the OOK signal. The bits of the received wake-up sequence are reconstructed using a low power comparator 714. The preamble detector 716 sends an interrupt to the microcontroller, which then reads the data from the output of the comparator 714.

Figure 8:
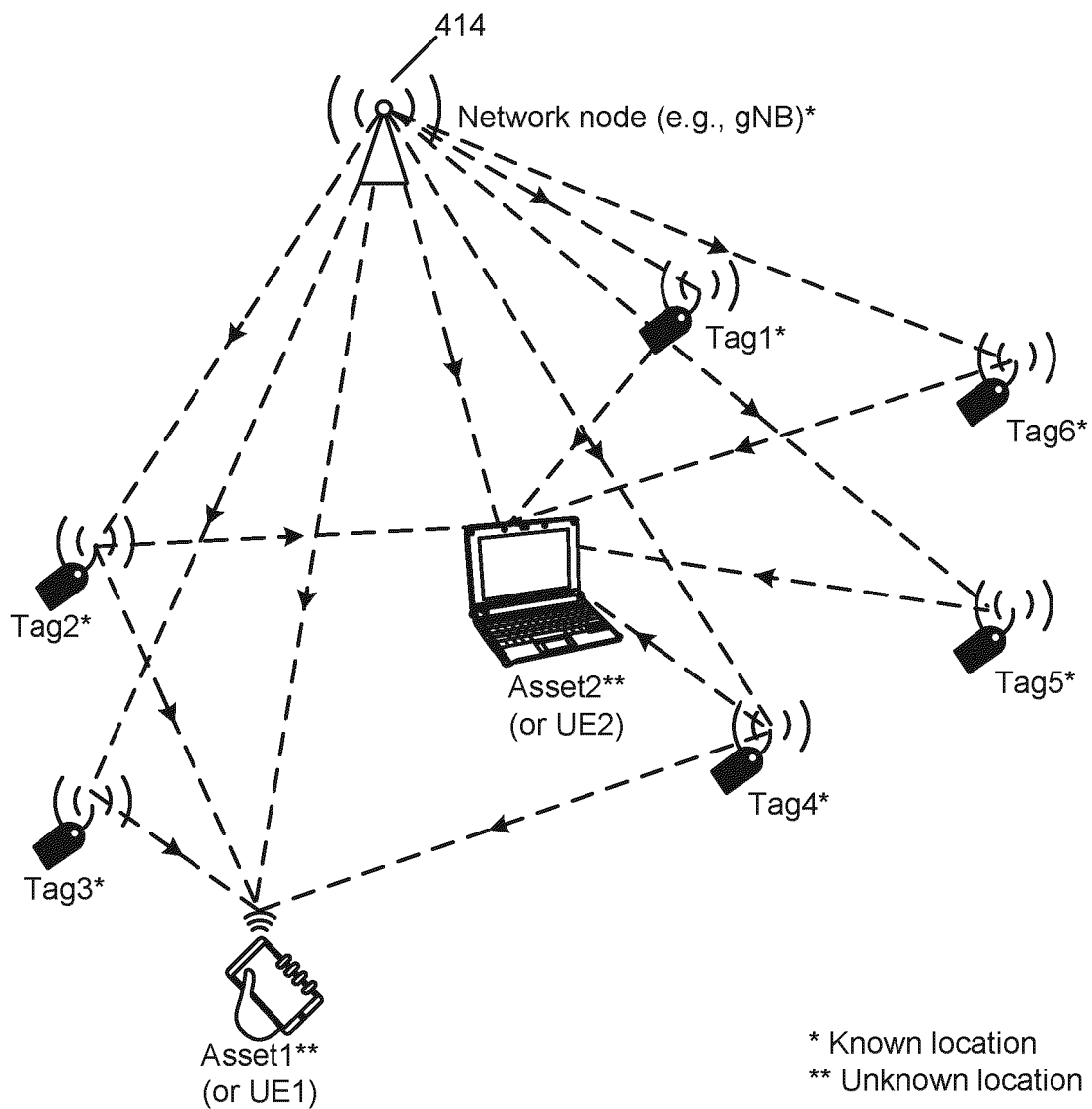
FIG. 8 is a diagram illustrating an example backscatter communication system.

FIG. 8 is a diagram illustrating an example backscatter communication system. As shown in FIG. 8, a network node (e.g., gNB) 414 may be in communication with other nodes, such as with an asset1 (or UE1), and an asset2 (UE2). gNB 414 may transmit a signal, such as a OFDM signal, or a chirp spread spectrum signal (CSS) to be frequency shifted and reflected by one or more tags (such as Tag1, Tag2, Tag3, Tag4, Tag5, Tag6, etc.), shown in FIG. 8. Each of the tags (or backscatter nodes), such as Tag1, Tag2, Tag3, Tag4, Tag5, Tag6, etc., may include a backscatter transmitter to frequency shift, modulate and reflect a received signal, based on a configuration received by the tag that may indicate a frequency offset that the tag should use.

Figures 9A, 9B:
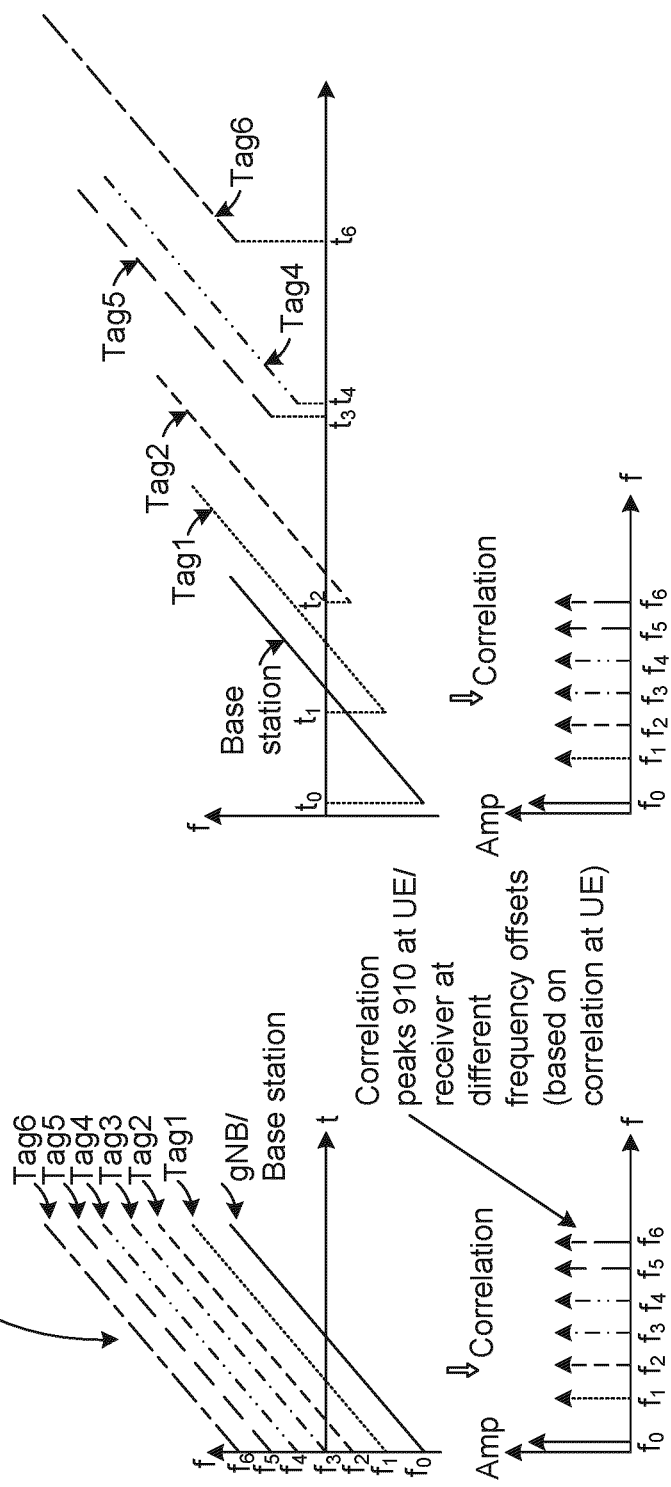
FIGS. 9A and 9B are diagrams illustrating an example transmission of chirp spread spectrum signals (CSS), and example correlation results of the CSS signals at a receiver.

As shown in FIGS. 8, 9A and 9B, each tag or backscatter node may be assigned a different frequency offset in order to allow a backscatter node (e.g., either Tag1, Tag2, Tag3, Tag4, Tag5, Tag6, etc.) to frequency shift (by an assigned frequency offset) and transmit a received signal. Each asset (which may be co-located with a UE) may be located at an unknown location, while each or one or more of the tags or backscatter nodes may be provided at known locations. Based on the received backscatter signals, a UE, the gNB 414, or a LMF, may determine or calculate the location of the UE or asset, such as the location of one or more UEs or assets, such as asset1, asset2, etc. The two assets (asset1 co-located with UE1, asset2 co-located with UE2) may include backscatter receivers and may function as 5G user equipment (UEs) communicating with the gNB or network node 414. The gNB 414 initially emits a preamble code to wake up the backscatter nodes (backscatter tags or backscatter transmitters, e.g., Tag1, Tag2, Tag3, Tag4, Tag5, Tag6, ...) and the backscatter receivers (e.g., the UEs that may receive the reflected backscatter signals). Then gNB 414 may transmit a CSS signal for positioning the assets. Each of the backscatter nodes (backscatter tags) frequency shifts (shifts the frequency of the incoming/received signal) by a backscatter node-specific frequency offset and reflects the received or incoming signal, in order to transmit a frequency-shifted (or backscatter) signal. As an example, Tag1 (or backscatter node 1) shifts the frequency of the received signal by frequency offset f1, Tag2 (or backscatter node 2) shifts the frequency of the received signal by frequency offset f2, Tag3 (or backscatter node 3) shifts the frequency of the received signal by frequency offset f3, etc., as shown in FIG. 9A. Some of the frequency shifted backscatter signals (and possibly the original signal transmitted by the base station or gNB) are received by the assets or UEs. Note that it is not mandatory to receive the signal from the base station, neither is it mandatory to receive signals from all the backscatter nodes (backscatter tags). Note that, in an illustrative example, the lowest number of signals required for a trilateration operation may be three. In the example in FIG. 8, Asset1 (UE1) receives four signals from the base station, Tag2, Tag3 and Tag4, whereas, Asset2 (UE2) receives six signals from the base station/network node, Tag1, Tag2, Tag4, Tag5 and Tag6. For example, the gNB 414 (network node) may transmit a 500 kHz chirp spread spectrum (CSS) signal and the backscatter nodes or tags (Tag1, Tag2, Tag3, Tag4, Tag5, Tag6) may use low-power microcontrollers to shift this signal by an assigned frequency offset and backscatter or reflect this frequency shifted signal (which may be received by the UE(s)). The frequency offset (e.g., f1, f2, f3, f4, ...) used by the different backscatter nodes (or backscatter tags) are different for different backscatter nodes/tags to avoid interference with each other, and/or to allow the transmitting tag or backscatter node to be identified at (or identifiable by) a backscatter receiver (e.g., UE). For example, Tag1's frequency offset (or frequency shift) f1 may be 50 kHz, f2=100 kHz, f3=150 kHz and so on. Thus, in this example, each of the frequency offsets f1, f2, f3, f4, f5, f6, ..., are spaced apart by 50 kHz, although other frequency offsets or frequency offset spacings may be used.

Thus, Tag 1 (or backscatter node 1) receives an original signal at frequency f0, and then frequency shifts to frequency offset f1 and reflects this received signal. For example, frequency offset f1 may be 50 kHz above (or greater than) the base frequency f0 used by the gNB/network node to transmit the original signal (e.g., which may be a CSS or OFDM signal to be reflected by the backscatter nodes). Other frequency shifted backscatter signals may be provided at different frequency offsets (f2, f3, f4, f5, f6, ...) with respect to the base frequency f0 of the original gNB/network node transmitted (e.g., CSS) signal.

FIGS. 9A and 9B are diagrams illustrating an example transmission of chirp spread spectrum signals (CSS), and example correlation results of the CSS signals at a receiver. As shown in FIG. 9A, an initial CSS signal may be transmitted at frequency f0 by gNB 414 (or BS or network node; see FIGS. 4, 8). A chirp spread spectrum signal has a linearly changing (e.g., increasing or decreasing) frequency over a bandwidth (BW), e.g., from −BW/2 to BW/2. The CSS signal may be an upchirp CSS, with a linearly increasing frequency over a time period, or a downchirp CSS signal with a linearly decreasing frequency over a time period. In some cases, an opposite or inverted (or inverse) chirp CSS signal may be used at a receiver (e.g., UE) to perform correlation for received CSS signal(s) (e.g., a downchirp signal may be used by a UE to perform correlation for a received upchirp signal; and an upchirp signal may be used by a UE to perform correlation for a received downchirp signal). The CSS signals shown in FIGS. 9A and 9B are upchirp signals 908 transmitted by gNB 414 and CSS signals reflected by different backscatter nodes or Tags, since each of the upchirp CSS signals 908 increases in frequency over time, beginning from a starting or initial frequency of f0 (for gNB/network node 414), f1 (for Tag1 or backscatter node 1), f2 (for Tag2 or backscatter node 2), f3 (for Tag3 or backscatter node 3), f4 (for Tag4 or backscatter node 4), f5 (for Tag5 or backscatter node 5), f6 (for Tag6 or backscatter node 6).

The backscatter nodes or tags may each frequency shift the received CSS signal (transmitted by gNB 414 at frequency f0) by a frequency offset assigned to the tag or backscatter node, and then reflect the frequency shifted CSS signal to UEs. For example, Tag1 (or backscatter node 1) may frequency shift the CSS signal to frequency offset f1 (where f1 is a frequency offset assigned to Tag1, for example), and then reflect the frequency shifted signal; Other backscatter nodes or tags may frequency shift the CSS signal by a different frequency offset, such as (as shown by upchirp CSS signals 908, FIG. 9A): Tag2 (or backscatter node 2) may frequency shift the CSS signal to frequency offset f2; Tag3 (or backscatter node 3) may frequency shift the CSS signal to frequency offset f3; Tag4 (or backscatter node 4) may frequency shift the CSS signal to frequency offset f4; Tag5 (or backscatter node 5) may frequency shift the CSS signal to frequency offset f5; Tag6 (or backscatter node 6) may frequency shift the CSS signal to frequency offset f6, etc. Upper part of FIG. 9A shows a CSS signal transmitted by gNB 414 and reflected CSS signals (908) from Tags (or backscatter nodes) 1-6 (delays due to different link propagation delays are not shown in FIG. 9A). Lower part of FIG. 9A shows correlation peaks from correlation of received CSS signals at UE. FIG. 9B shows the same information, but includes or takes into account the delays due to different propagation delays of the different wireless links.

Referring to FIGS. 9A and 9B, when the, e.g., six chirps (CSS signals) are correlated at the receiver (e.g., at each UE) with an inverted chirp, correlation peaks at frequencies (or frequency offsets) f0, f1, f2, f3, f4, f5 and f6 can be observed. However, signals from all tags may not always be received at a UE. As shown in FIG. 8, Asset2 receives signals from gNB 414 and Tag1, Tag2, Tag4, Tag5 and Tag6 only. These signals arrive at Asset2 at different times depending on the distances between base station-tag link and tag-asset asset link, as shown in FIG. 9B. FIG. 9A shows the 7 chirp signals that may be received at the same time, and correlation peaks that may result based on correlation at a receiver using inverted chirp CSS signals at the different frequency offsets. However, because of different gNB-backscatter node links, and different backscatter node-UE links, these different CSS signals (from various tags) may be received by a UE at different times. FIG. 9B shows an example scenario where six CSS signals are received at times t0, t1, t2, t4, t5 and t6. Thus, the asset or UE may receive backscatter signals at different frequency offsets from Tags 1, 2, 4, 5 and 6. However, regardless of the specific time a CSS signal is received, a correlation at the receiver may provide correlation peaks at the shifted frequencies (based on a received CSS signal). The UE (receiver) may then determine a phase of each received CSS signal (for which a correlation peak greater than a threshold was detected, at the different frequency offsets).

When the gNB 414 (network node or base station) transmits the CSS signal, for example (e.g., see FIG. 8), the CSS signal may propagate a total distance of $d_2+d_{21}$ for the link between gNB 414, Tag2 and Asset1. This includes the distance that the signal travelled from gNB 414 to Tag2 ($d_2$) and the tag to the Asset1 ($d_{21}$). The wireless channel h of this signal may be modelled as $h=Ae^{j\phi_0}$ where A is the total attenuation and, $\phi_0$ is the channel phase. $\phi_0$ depends on several factors such as hardware related phase changes at the base station ($\phi_{tx}$), Tag2 ($\phi_{tag2}$) and Asset1 ($\phi_{A1}$). Further, the distance travelled between the gNB 414 and Tag1 induces a phase offset of $2\pi d_2 f_0/c$ where $f_0$ is the initial frequency of the chirp and c is the speed of light. The distance travelled between Tag2 and Asset1 further introduces a phase shift $2\pi d_{21}(f_0-\Delta f_2)/c$ where $\Delta f$ is the frequency shift at Tag2. In addition to that, a carrier frequency offset (CFO) between the gNB and Asset1 further introduces a phase shift. Finally, the channel phase, $\phi_0$ can be written as $$\phi_0 = -\frac{2\pi d_2 f_0}{c} - \frac{2\pi d_{21}(f_0-\Delta f_2)}{c} + \phi_{tx} + \phi_{tag2} + \phi_{A1} + \phi_{CFO} \quad [1]$$

In an illustrative example, the distance $d_2+d_{21}$ may be estimated for a channel among the gNB-tag-asset link using the phase of the received chirp ($\phi_{chirp}$) at the asset. Asset1 correlates the received chirp signal with a downchirp which adds the phase across all the frequencies of the received chirp during the correlation operation. At this point, CFO can be removed by leveraging the fact that a constant frequency offset occurs when the upchirp is shifted in time based on Eq. [1]. Therefore, the chirp phase extracted after correcting for the CFO is the sum of the phases at each of the frequencies in the chirp. $\phi_0$ is estimated by leveraging the fact that $\phi_{chirp}$ is related to the channel phase $\phi_0$ at frequency $f_0$ according to the following relationship [1], $$\phi_{chirp} = \phi_0 + \phi_0\frac{\lambda_0}{\lambda_1} + \ldots + \phi_0\frac{\lambda_0}{\lambda_{N-1}} \quad [2]$$

where $\lambda_0$ is the wavelength corresponding to frequency $f_0$ at the beginning of the chirp, $\lambda_1$ is the wavelength of the next frequency in the chirp and $\lambda_{n-1}$ is the wavelength corresponding to the frequency at the end of the chirp. Solving this equation, $\phi_0$ is estimated. All the phases contributing to $\phi_0$ in Eq. [1] except $$\frac{2\pi d_{21}(f_0-\Delta f_2)}{c}$$

are fixed offsets which can be removed by normalizing to the first antenna, essentially, subtracting the phase of the first antenna from the other antennas of the receiver. Finally, the direction of arrival of this signal at Asset1 can be estimated using multiple signal classification (MUSIC) algorithm of Eq. [2]. To find the position of Asset1, trilateration is performed from signals impinging on the antenna array from at least three different tags. Once the position coordinates of the asset are estimated, the asset (or UE) may transmit this back to gNB using the Uu link that exists between the UE and gNB 414. Therefore, the UE may calculate its location (or position coordinates), and then transmit its location to the gNB 414. Or, the UE may send a phase and frequency offset (e.g., received by each of one or more antennas of the UE) to the gNB 414, which may be used by gNB 414 (FIGS. 4 and 8) or LMF 416 (FIG. 4) (or other position control entity) to determine the location or position of the UE or asset (e.g., where the asset may be co-located with the UE).

Figure 10:
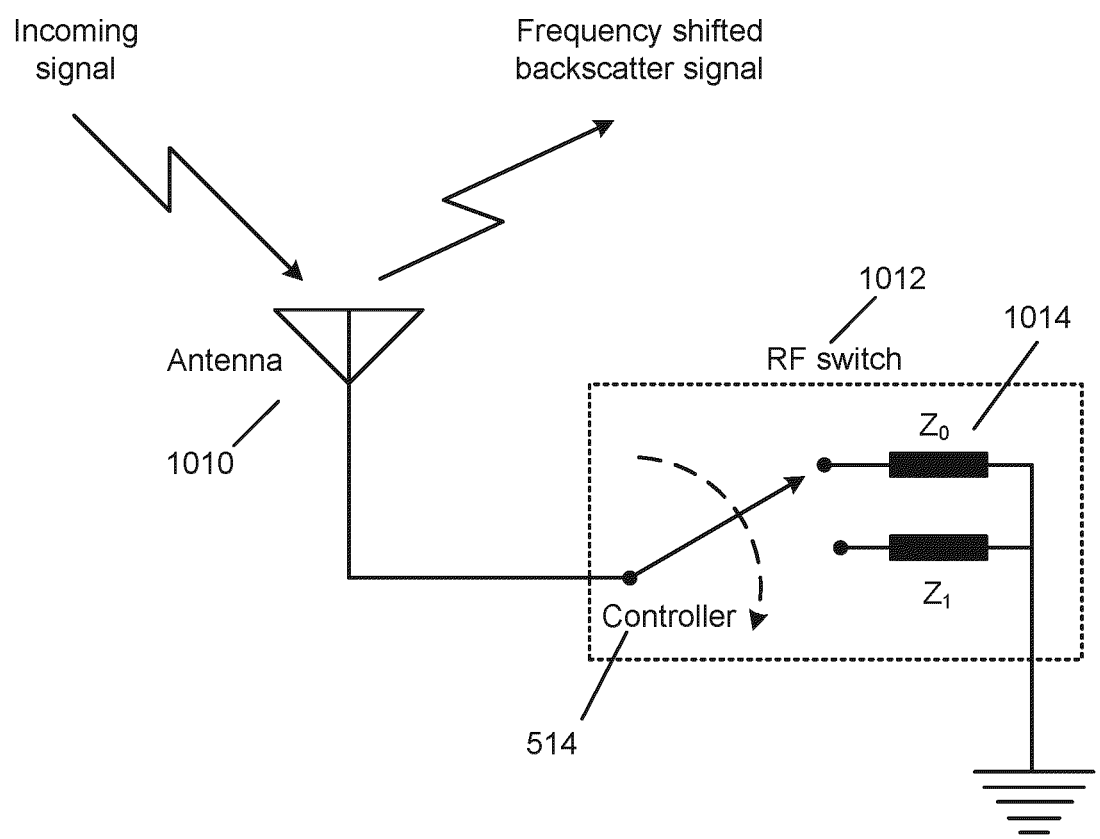
FIG. 10 is a diagram illustrating an example of a tag or backscatter node 410.

FIG. 10 is a diagram illustrating an example of a tag or backscatter transmitter, which may be part of a backscatter node (see FIG. 5) or backscatter tag. As shown in FIG. 10, the backscatter transmitter may include an antenna 1010, an RF (radio frequency) switch 1012, a digital controller such as an FPGA or a microcontroller unit 514 (see also FIG. 5), and impedance loads 1014 ($Z_0$ and $Z_1$) to change the reflection coefficient of the antenna. The backscatter transmitter in FIG. 10 may be powered by a coin cell or a button cell battery. To shift the frequency of the incoming signal, the backscatter transmitter changes the reflection coefficient of the tag over time so that the reflection coefficient approximates a sine wave. Whereas the sinusoid can be a real sine wave, here, a digital square wave signal approximates the sine wave. To generate the square wave, the RF switch 1012 connects different impedances to the antenna 1010, and the microcontroller unit 514 toggles the RF switch 1012 between impedances $Z_0$ and $Z_1$ to change the reflection coefficient. Each square wave has a unique toggling frequency which dictates the frequency shift, and each backscatter tag is identified at the receiver from this frequency shift.

Figure 11:
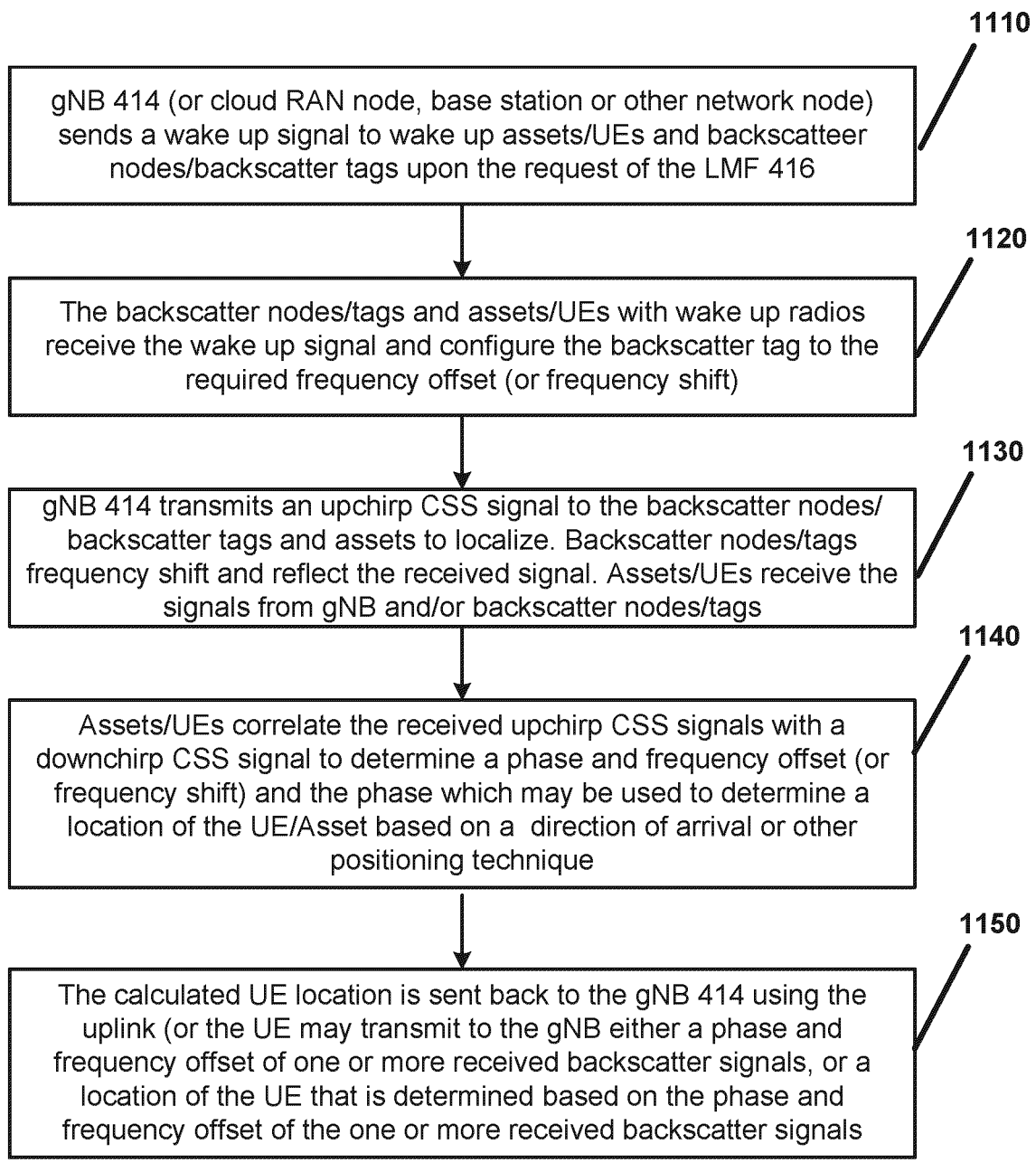
FIG. 11 is a flow chart illustrating operation of a system, based on the flow charts of FIGS. 2, 3A, 3B, and as illustrated and/or described with reference to FIGS. 4-10.

FIG. 11 is a flow chart illustrating operation of a system, based on the flow charts of FIGS. 2, 3A, 3B, and as illustrated and described with reference to FIGS. 4-10. At 1110, gNB 414 (FIGS. 4, 6, 8) (or a cloud RAN node, base station or other network node) may send a wake-up signal 420 (FIG. 4) to wake up the assets or UEs (e.g., where an asset1 may be co-located with UE1) (e.g., including to wakeup UE 412, FIGS. 4, 6; and/or to wakeup UE1 and UE2, FIG. 8), and to wakeup backscatter nodes or backscatter tags (such as to wakeup backscatter node or tag 410, FIG. 4, and/or to wakeup Tags/backscatter nodes 1, 2, 3, 4, 5, 6, FIG. 8). The sending of the wakeup signal may be performed upon the request of LMF 416 (FIG. 4) or other positioning control entity.

At 1120, the backscatter nodes or tags (e.g., backscatter node or tag 410, FIG. 4; and/or backscatter nodes or Tags 1-6, FIG. 8) and assets/UEs (e.g., UE1, UE2) may receive a wakeup signal and the backscatter nodes or tags are configured to a required or assigned frequency offset (e.g., frequency offset f1 assigned to backscatter node 1 or Tag1, frequency offset f2 assigned to backscatter node 2 or Tag 2, frequency offset f3 assigned to backscatter node 3 or Tag3, frequency offset f4 assigned to backscatter node 4 or Tag4, frequency offset f5 assigned to backscatter node 5 or Tag5, and frequency offset f6 assigned to backscatter node 6 or Tag6, as shown in FIGS. 8, 9A, 9B, for example).

At 1130, a gNB (e.g., gNB 414 (FIGS. 4, 6)) may transmit a signal (422, FIG. 4), e.g., such as an upchirp CSS signal to backscatter nodes or tags and to UEs/assets, to localize (e.g., to cause the backscatter nodes or tags and UEs to perform a positioning procedure to allow the location of the UE(s) to be determined based on phase information and frequency offsets of received backscatter signals). The backscatter nodes or tags (e.g., backscatter node or tag 410, FIG. 4, and/or backscatter nodes or Tags 1-6 of FIG. 6) each frequency shifts, by the assigned backscatter node-specific frequency offset, and reflects the received signal (e.g., the received upchirp CSS signal) to the UEs/assets (e.g., to UE 412, FIG. 4, or UE1, UE2, FIG. 8). The UEs/assets (e.g., UE 412, FIG. 4, and/or UE1 and UE2, FIG. 6) receive the signals from the gNB 414 and the backscatter nodes or tags (e.g., the UEs may receive the original upchirp CSS signal transmitted at frequency f0, and may also receive (one or more or even all of) the frequency shifted and reflected upchirp CSS (backscatter) signals from the backscatter nodes or tags, at their assigned frequency offsets f1, f2, f3, f4, f5, and f6, such as, for example, shown in FIGS. 9A, 9B).

At 1140, the UEs may correlate the received upchirp signals with a downchirp CSS signal to determine a phase and a frequency offset (or frequency shift) of one or more received frequency shifted (backscatter) signals, which may be used to determine a location of the UE/Asset based on a direction of arrival or other positioning technique. A UE may determine its location (and thus the location of a co-located asset) based on the UE measured phase and frequency offset of one or more received backscatter signals, and locations of the backscatter nodes or tags known by the UE.

Alternatively, the UE may forward the (UE measured) phases and frequency offsets of the received backscatter signals to the gNB 414, to allow the gNB or a positioning control entity to determine the location of the UE based on phase and frequency offset of the backscatter signals and locations of the backscatter nodes known by the gNB or positioning control entity (e.g., LMF).

At 1150, the calculated UE location may be sent back to the gNB 414 via uplink transmission. The UE may transmit to the gNB either: a phase and frequency offset of one or more received backscatter signals; or a location of the UE that has been determined by the UE based on the phase and frequency offset of the one or more received backscatter signals.

Thus, with respect to operation 1150 of FIG. 11, for example, at least one of the user device (UE) or a positioning control entity (e.g., LMF or other entity) will know the locations of the backscatter nodes, depending on which entity determines a location of the user device. If the UE determines its location based on phase information and frequency offsets of the received backscatter signals, then at least the UE will know the locations of the backscatter nodes (e.g., because the UE will determine its location based on the phase information and frequency offsets of the backscatter signals, and locations of the backscatter nodes known by the UE). On the other hand, if the positioning control entity (e.g., LMF, or network node) determines a location of the UE, then at least the positioning control entity will know the locations of the backscatter nodes (e.g., because the positioning control entity will determine the location of the UE based on the UE measured phase information and frequency offsets of the backscatter signals, and locations of the backscatter nodes known by the network node or positioning control entity). Thus, in such case where the positioning control entity determines the UE's location, the user device/UE may not necessarily know the locations of the backscatter nodes.

Example 1. A method comprising: controlling receiving, by a user device, frequency-shifted signals from a plurality of backscatter nodes for locating the user device, wherein each of the plurality of backscatter nodes is identifiable by a backscatter node-specific frequency offset of the frequency-shifted signals according to a configuration; (e.g., at 424, backscatter node 410 may frequency shift (by a frequency offset assigned to or associated with the backscatter node 410) and reflect the received signal, to thereby transmit a reflected backscatter signal, which may be received by various UEs, such as by UE 412; Also, at 1130 (FIG. 11), a gNB (e.g., gNB 414 (FIGS. 4, 6)) may transmit a signal (422, FIG. 4), e.g., such as an upchirp CSS signal to backscatter nodes or tags and to UEs/assets, to localize (e.g., to cause the backscatter nodes or tags and UEs to perform a positioning procedure to allow the location of the UE(s) to be determined based on phase information and frequency offsets of received backscatter signals). The backscatter nodes or tags (e.g., backscatter node or tag 410, FIG. 4, and/or backscatter nodes or Tags 1-6 of FIG. 6) each frequency shifts, by the assigned backscatter node-specific frequency offset, and reflects the received signal (e.g., the received upchirp CSS signal) to the UEs/assets (e.g., to UE 412, FIG. 4, or UE1, UE2, FIG. 8). The UEs/assets (e.g., UE 412, FIG. 4, and/or UE1 and UE2, FIG. 6) receive the signals from the gNB 414 and the backscatter nodes or tags (e.g., the UEs may receive the original upchirp CSS signal transmitted at frequency f0, and may also receive (one or more or even all of) the frequency shifted and reflected upchirp CSS (backscatter) signals from the backscatter nodes or tags, at their assigned frequency offsets f1, f2, f3, f4, f5, and f6, such as, for example, shown in FIGS. 9A, 9B);

determining, by the user device, phase information and a frequency offset for each of the received frequency-shifted signals (e.g., at 426 (FIG. 4), UE 412 may perform correlation for the received backscatter signals, to determine phase information (e.g., a phase) and frequency offset of each received backscatter signal, for example. UE 412, for example, may include one or more antennas, e.g., as part of an antenna system or antenna array. For example, for each of one or more antennas, UE 412 may perform a correlation on the received backscatter signals to detect a peak amplitude and a phase, for each channel or frequency offset. Each different frequency offset or channel may be associated with (or may be used to identify) a backscatter node or tag that transmitted a backscatter signal. As noted, each backscatter node may be assigned a backscatter node-specific frequency offset. And, thus, each backscatter node (e.g., that transmitted a frequency shifted (backscatter) signal) is identifiable based on a frequency or frequency offset of the received backscatter signal. Thus, at 428, UE 412 (e.g., which may include a backscatter receiver) may determine a phase and frequency offset for one or more received backscatter signals, for each of one or more antennas, e.g., based on correlation. For example, UE 412 may receive backscatter signals from multiple or many (e.g., 2, 3, 4, 5, 6, . . . ) backscatter nodes (or backscatter tags), and may perform correlation, at various frequency offsets, to detect a phase and peak amplitude (above a threshold) for one or more received backscatter signals from various backscatter nodes or tags; and, at 1140 (FIG. 1140), the UEs may correlate the received upchirp signals with a downchirp CSS signal to determine a phase and a frequency offset (or frequency shift) of one or more received frequency shifted (backscatter) signals, which may be used to determine a location of the UE/Asset based on a direction of arrival or other positioning technique); and controlling transmitting, by the user device to a network node that provides the configuration: the phase information and the frequency offset for each of the received frequency-shifted signals, for a positioning control entity to carry out the locating of the user device based on the phase information, the frequency offset for each of the received frequency-shifted signals and locations of the plurality of backscatter nodes known by the positioning control entity (e.g., at 430 (FIG. 4), UE 412 may transmit to gNB 414 the determined phase and frequency offset (which identifies the backscatter node or tag that transmitted the backscatter signal that was received and correlated by the UE 412) for one or more backscatter signals); or a location of the user device that is determined, by the user device, based on the phase information, the frequency offset for each of the received frequency-shifted signals and locations of the plurality of backscatter nodes known by the user device (e.g., alternatively, at 430, rather than UE 412 transmitting a message to gNB 414 that indicates a phase and a frequency offset for one or more received backscatter signals (e.g., for one or more antennas of UE 412), the UE 412 may determine its location based on the determined phase and frequency offsets for the one or more backscatter signals and locations of backscatter nodes known by the UE 412, and then the UE 412 may send a message at 430 to gNB 414 indicating its location (e.g., X, Y coordinates, GPS coordinates, or other location information indicating a location of UE 412).

Example 2. The method of example 1, wherein a backscatter node-specific frequency offset is associated with or assigned to each of the backscatter nodes such that a backscatter node that transmitted a frequency-shifted signal is identifiable based on a frequency offset of the transmitted frequency-shifted signal (e.g., a backscatter node-specific frequency offset is associated with or assigned to each of the backscatter nodes such that a backscatter node that transmitted a frequency-shifted (e.g., backscatter) signal is identifiable based on a frequency offset of the transmitted (and received) frequency-shifted (backscatter) signal; also, as shown in FIGS. 8, 9A and 9B, each tag or backscatter node may be assigned a different frequency offset in order to allow a backscatter node (e.g., either Tag1, Tag2, Tag3, Tag4, Tag5, Tag6, etc.) to frequency shift (by an assigned frequency offset) and transmit a received signal. Each of the backscatter nodes (backscatter tags) frequency shifts (shifts the frequency of the incoming/received signal) by a backscatter node-specific frequency offset and reflects the received or incoming signal, in order to transmit a frequency-shifted (or backscatter) signal. As an example, Tag1 (or backscatter node 1) shifts the frequency of the received signal by frequency offset f1, Tag2 (or backscatter node 2) shifts the frequency of the received signal by frequency offset f2, Tag3 (or backscatter node 3) shifts the frequency of the received signal by frequency offset f3, etc., as shown in FIG. 9A).

Example 3. The method of any of examples 1-2, wherein each of the frequency-shifted signals comprises a backscatter signal and comprises one of the following: an orthogonal frequency division multiplexing (OFDM) signal reflected by a backscatter node in which a frequency has been shifted by a backscatter node-specific frequency offset associated with or assigned to the backscatter node; or a chirp spread spectrum signal, including at least one of a downchirp signal or an upchirp signal, reflected by a backscatter node in which a frequency has been shifted by a backscatter node-specific frequency offset associated with or assigned to the backscatter node (e.g., FIGS. 9A and 9B are diagrams illustrating an example transmission of chirp spread spectrum signals (CSS), and example correlation results of the CSS signals at a receiver. As shown in FIG. 9A, an initial CSS signal may be transmitted at frequency f0 by gNB 414 (or BS or network node; see FIGS. 4, 8). A chirp spread spectrum signal has a linearly changing (e.g., increasing or decreasing) frequency over a bandwidth (BW), e.g., from −BW/2 to BW/2. The CSS signal may be an upchirp CSS, with a linearly increasing frequency over a time period, or a downchirp CSS signal with a linearly decreasing frequency over a time period).

Example 4. The method of any of examples 1-3, wherein the determining, by the user device, phase information and a frequency offset for each of the received frequency-shifted signals comprises performing at least one of: performing, by the user device, a correlation on the received frequency-shifted signals to detect a peak amplitude that is greater than a threshold and a phase, for one or more of the backscatter node-specific frequency offsets; performing, by the user device, a correlation on the received frequency-shifted signals to detect a peak amplitude that is greater than a threshold and a phase of each of a plurality of user device antenna elements, for one or more of the backscatter node-specific frequency offsets (e.g., FIGS. 9A and 9B are diagrams illustrating an example transmission of chirp spread spectrum signals (CSS), and example correlation results of the CSS signals at a receiver. As shown in FIG. 9A, an initial CSS signal may be transmitted at frequency f0 by gNB 414 (or BS or network node; see FIGS. 4, 8). In some cases, an opposite or inverted (or inverse) chirp CSS signal may be used at a receiver (e.g., UE) to perform correlation for received CSS signal(s) (e.g., a downchirp signal may be used by a UE to perform correlation for a received upchirp signal; and an upchirp signal may be used by a UE to perform correlation for a received downchirp signal). The CSS signals shown in FIGS. 9A and 9B are upchirp signals 908 transmitted by gNB 414 and CSS signals reflected by different backscatter nodes or Tags, since each of the upchirp CSS signals 908 increases in frequency over time, beginning from a starting or initial frequency of f0 (for gNB/network node 414), f1 (for Tag1 or backscatter node 1), f2 (for Tag2 or backscatter node 2), f3 (for Tag3 or backscatter node 3), f4 (for Tag4 or backscatter node 4), f5 (for Tag5 or backscatter node 5), f6 (for Tag6 or backscatter node 6); also, UE 412 (FIG. 4), for example, may include one or more antennas, e.g., as part of an antenna system or antenna array. For example, for each of one or more antennas, UE 412 may perform a correlation on the received backscatter signals to detect a peak amplitude and a phase, for each channel or frequency offset).

Example 5. The method of any of examples 1-4, wherein the controlling transmitting comprises: controlling transmitting, by the user device to a network node that provides the configuration, the phase information and the frequency offset for each of the received frequency-shifted signals, for a positioning control entity to carry out the locating of the user device based on the phase information, the frequency offset for each of the received frequency-shifted signals and locations of the plurality of backscatter nodes known by the positioning control entity (e.g., at 430 (FIG. 4), UE 412 may transmit to gNB 414 the determined phase and frequency offset (which identifies the backscatter node or tag that transmitted the backscatter signal that was received and correlated by the UE 412) for one or more backscatter signals).

Example 6. The method of any of examples 1-5 further comprising: determining, by the user device, a location of the user device, based on the phase information, the frequency offset for each of the received frequency-shifted signals and locations of the plurality of backscatter nodes known by the user device; wherein the controlling transmitting comprises: controlling transmitting, by the user device to a network node that provides the configuration, the location of the user device that is determined by the user device (e.g., alternatively, at 430, rather than UE 412 transmitting a message to gNB 414 that indicates a phase and a frequency offset for one or more received backscatter signals, the UE 412 may determine its location based on the determined phase and frequency offsets for the one or more backscatter signals and locations of backscatter nodes known by the UE 412, and then the UE 412 may send a message at 430 to gNB 414 indicating its location (e.g., X, Y coordinates, GPS coordinates, or other location information indicating a location of UE 412).

Example 7. The method of any of examples 1-6, wherein the configuration comprises a location measurement configuration, the method further comprising: controlling receiving, by the user device from the network node, the location measurement configuration including at least a backscatter node-specific frequency offset of a frequency-shifted signal for each of the plurality of backscatter nodes, and a location of each of the plurality of backscatter nodes (e.g., with respect to the method or flow chart of FIGS. 3A-3B, the configuration information may include a location measurement configuration (or other configuration information) indicating: a location of each of the backscatter nodes; a different backscatter node-specific frequency offset assigned to each of the plurality of backscatter nodes; and an indication of a positioning procedure or one or more parameters for the positioning procedure, to be used by the user device to determine a location of the user device; see also 1120, FIG. 11).

Example 8. The method of example 7, wherein the location measurement configuration comprises information indicating: a location of each of the backscatter nodes; a different backscatter node-specific frequency offset assigned to each of the plurality of backscatter nodes; and an indication of a positioning procedure or one or more parameters for the positioning procedure, to be used by the user device to determine a location of the user device (e.g., with respect to the method or flow chart of FIGS. 3A-3B, the configuration information may include a location measurement configuration (or other configuration information) indicating: a location of each of the backscatter nodes; a different backscatter node-specific frequency offset assigned to each of the plurality of backscatter nodes; and an indication of a positioning procedure or one or more parameters for the positioning procedure, to be used by the user device to determine a location of the user device).

Example 9. The method of any of examples 1-8, further comprising: receiving, by the user device from the network node, a wakeup signal; and transitioning, in response to receiving the wakeup signal, by the user device from a low power state to a full power state in order to receive the plurality of backscatter signals (at 420 (FIG. 4), gNB 414 may send a wakeup signal and a preamble (e.g., for synchronization) to UE 412 (which may be in an inactive or low power state) . . . . The wakeup signal may wakeup the UE 412 and/or backscatter node 410 (e.g., causing these nodes to transition to a low power state or sleep state, or to a full power operational state).

Example 10. A non-transitory computer-readable storage medium comprising instructions stored thereon that, when executed by at least one processor, are configured to cause a computing system to perform the method of any of examples 1-9.

Example 11. An apparatus comprising means for performing the method of any of examples 1-9.

Example 12. An apparatus comprising: at least one processor; and at least one memory including computer program code; the at least one memory and the computer program code configured to, with the at least one processor, cause the apparatus at least to perform the method of any of examples 1-9.

Example 13. An apparatus comprising: at least one processor; and at least one memory including computer program code; the at least one memory and the computer program code configured to, with the at least one processor, cause the apparatus at least to: control receiving, by a user device, frequency-shifted signals from a plurality of backscatter nodes for locating the user device, wherein each of the plurality of backscatter nodes is identifiable by a backscatter node-specific frequency offset of the frequency-shifted signals according to a configuration; determine, by the user device, phase information and a frequency offset for each of the received frequency-shifted signals; and control transmitting, by the user device to a network node that provides the configuration: the phase information and the frequency offset for each of the received frequency-shifted signals, for a positioning control entity to carry out the locating of the user device based on the phase information, the frequency offset for each of the received frequency-shifted signals and locations of the plurality of backscatter nodes known by the positioning control entity; or a location of the user device that is determined, by the user device, based on the phase information, the frequency offset for each of the received frequency-shifted signals and locations of the plurality of backscatter nodes known by the user device.

Example 14. The apparatus of example 13, wherein a backscatter node-specific frequency offset is associated with or assigned to each of the backscatter nodes such that a backscatter node that transmitted a frequency-shifted signal is identifiable based on a frequency offset of the transmitted frequency-shifted signal.

Example 15. The apparatus of any of examples 13-14, wherein each of the frequency-shifted signals comprises a backscatter signal and comprises one of the following: an orthogonal frequency division multiplexing (OFDM) signal reflected by a backscatter node in which a frequency has been shifted by a backscatter node-specific frequency offset associated with or assigned to the backscatter node; or a chirp spread spectrum signal, including at least one of a downchirp signal or an upchirp signal, reflected by a backscatter node in which a frequency has been shifted by a backscatter node-specific frequency offset associated with or assigned to the backscatter node.

Example 16. The apparatus of any of examples 13-15, wherein the apparatus being configured to determine, by the user device, phase information and a frequency offset for each of the received frequency-shifted signals comprises the apparatus being configured to perform at least one of: perform, by the user device, a correlation on the received frequency-shifted signals to detect a peak amplitude that is greater than a threshold and a phase, for one or more of the backscatter node-specific frequency offsets; perform, by the user device, a correlation on the received frequency-shifted signals to detect a peak amplitude that is greater than a threshold and a phase of each of a plurality of user device antenna elements, for one or more of the backscatter node-specific frequency offsets Example 17. The apparatus of any of examples 13-16, wherein the apparatus being configured to control transmitting comprises the apparatus being configured to: control transmitting, by the user device to a network node that provides the configuration, the phase information and the frequency offset for each of the received frequency-shifted signals, for a positioning control entity to carry out the locating of the user device based on the phase information, the frequency offset for each of the received frequency-shifted signals and locations of the plurality of backscatter nodes known by the positioning control entity; or Example 18. The apparatus of any of examples 13-16, the apparatus further being configured to: determine, by the user device, a location of the user device, based on the phase information, the frequency offset for each of the received frequency-shifted signals and locations of the plurality of backscatter nodes known by the user device; wherein the apparatus being configured to control transmitting comprises the apparatus being configured to: control transmitting, by the user device to a network node that provides the configuration, the location of the user device that is determined by the user device.

Example 19. The apparatus of any of examples 13-18, wherein the configuration comprises a location measurement configuration, the apparatus being further configured to: control receiving, by the user device from the network node, the location measurement configuration including at least a backscatter node-specific frequency offset of a frequency-shifted signal for each of the plurality of backscatter nodes, and a location of each of the plurality of backscatter nodes.

Example 20. The method of example 19, wherein the location measurement configuration comprises information indicating: a location of each of the backscatter nodes; a different backscatter node-specific frequency offset assigned to each of the plurality of backscatter nodes; and an indication of a positioning procedure or one or more parameters for the positioning procedure, to be used by the user device to determine a location of the user device.

Example 21. A method comprising:
controlling transmitting, by a network node to a plurality of backscatter nodes, the locations of which are known, configuration information comprising backscatter node-specific frequency offsets for the plurality of backscatter nodes, wherein each of the backscatter nodes is identifiable by a backscatter node-specific frequency offset (e.g., with respect to the method or flow chart of FIGS. 3A-3B, the configuration information may include a location measurement configuration (or other configuration information) indicating: a location of each of the backscatter nodes; a different backscatter node-specific frequency offset assigned to each of the plurality of backscatter nodes; and an indication of a positioning procedure or one or more parameters for the positioning procedure, to be used by the user device to determine a location of the user device; see also 1120, FIG. 11);

controlling receiving, by the network node from a positioning control entity, a location request for one or more user devices (Referring to FIG. 4, at 418, the LMF 416 may send a location request to gNB 414 to request a location of one or more UEs (or assets) or information or measurements upon which the LMF may determine a location of the one or more UEs, such as for UE 412);

controlling transmitting, by the network node, a signal to at least some of the plurality of backscatter nodes for the signal to be frequency shifted by a backscatter node-frequency offset according to the configuration information and transmitted by the at least some of the plurality of backscatter nodes to one or more user devices (e.g., at 424, backscatter node 410 may frequency shift (by a frequency offset assigned to or associated with the backscatter node 410) and reflect the received signal, to thereby transmit a reflected backscatter signal, which may be received by various UEs, such as by UE 412; Also, at 1130 (FIG. 11), a gNB (e.g., gNB 414 (FIGS. 4, 6)) may transmit a signal (422, FIG. 4), e.g., such as an upchirp CSS signal to backscatter nodes or tags and to UEs/assets, to localize (e.g., to cause the backscatter nodes or tags and UEs to perform a positioning procedure to allow the location of the UE(s) to be determined based on phase information and frequency offsets of received backscatter signals). The backscatter nodes or tags (e.g., backscatter node or tag 410, FIG. 4, and/or backscatter nodes or Tags 1-6 of FIG. 6) each frequency shifts, by the assigned backscatter node-specific frequency offset, and reflects the received signal (e.g., the received upchirp CSS signal) to the UEs/assets (e.g., to UE 412, FIG. 4, or UE1, UE2, FIG. 8). The UEs/assets (e.g., UE 412, FIG. 4, and/or UE1 and UE2, FIG. 6) receive the signals from the gNB 414 and the backscatter nodes or tags (e.g., the UEs may receive the original upchirp CSS signal transmitted at frequency f0, and may also receive (one or more or even all of) the frequency shifted and reflected upchirp CSS (backscatter) signals from the backscatter nodes or tags, at their assigned frequency offsets f1, f2, f3, f4, f5, and f6, such as, for example, shown in FIGS. 9A, 9B);

controlling receiving, by the network node from a user device: the phase information and the frequency offset for each of the received frequency-shifted signals, for a positioning control entity to carry out the locating of the user device based on the phase information, the frequency offset for each of the received frequency-shifted signals and locations of the plurality of backscatter nodes known by the positioning control entity; or a location of the user device that is determined, by the user device, based on the phase information, the frequency offset for each of the received frequency-shifted signals and locations of the plurality of backscatter nodes known by the user device (e.g., at 430 (FIG. 4), UE 412 may transmit to gNB 414 the determined phase and frequency offset (which identifies the backscatter node or tag that transmitted the backscatter signal that was received and correlated by the UE 412) for one or more backscatter signals); or a location of the user device that is determined, by the user device, based on the phase information, the frequency offset for each of the received frequency-shifted signals and locations of the plurality of backscatter nodes known by the user device (e.g., alternatively, at 430, rather than UE 412 transmitting a message to gNB 414 that indicates a phase and a frequency offset for one or more received backscatter signals (e.g., for one or more antennas of UE 412), the UE 412 may determine its location based on the determined phase and frequency offsets for the one or more backscatter signals and locations of backscatter nodes known by the UE 412, and then the UE 412 may send a message at 430 to gNB 414 indicating its location (e.g., X, Y coordinates, GPS coordinates, or other location information indicating a location of UE 412); and controlling transmitting, by the network node to the positioning control entity, at least one of the following: the phase information and the frequency offset, received by the network node and determined by the user device, for each of the plurality of received frequency-shifted signals; or the location of the user device, received by the network node and determined by the user device based on the phase information and frequency offset of the plurality of received backscatter signals and locations of the backscatter nodes known by the user device (At 430, UE 412 may transmit to gNB 414 the determined phase and frequency offset (which identifies the backscatter node or tag that transmitted the backscatter signal that was received and correlated by the UE 412) for one or more backscatter signals, e.g., for one or more antennas of the UE 412; at 432, the network node or gNB 414 may determine a location of one or more of the UEs or assets (such as a location of UE 412), using a triangulation positioning method or technique, e.g., based on the phases and frequency offsets received by gNB 414 from one or more UEs (such as from UE 412); At 432, gNB 414 may send a location response to LMF 416; Alternatively, at 430, rather than UE 412 transmitting a message to gNB 414 that indicates a phase and a frequency offset for one or more received backscatter signals (e.g., for one or more antennas of UE 412), the UE 412 may determine its location based on the determined phase and frequency offsets for the one or more backscatter signals and locations of backscatter nodes known by the UE 412, and then the UE 412 may send a message at 430 to gNB 414 indicating its location (e.g., X, Y coordinates, GPS coordinates, or other location information indicating a location of UE 412).

Example 22. The method of example 21 wherein the controlling transmitting a wireless signal comprises: controlling transmitting, by the network node, a signal to be reflected and frequency shifted, by a backscatter node-specific frequency offset, by each of the plurality of the backscatter nodes (e.g., at 424, backscatter node 410 may frequency shift (by a frequency offset assigned to or associated with the backscatter node 410) and reflect the received signal, to thereby transmit a reflected backscatter signal, which may be received by various UEs, such as by UE 412; Also, at 1130 (FIG. 11), a gNB (e.g., gNB 414 (FIGS. 4, 6)) may transmit a signal (422, FIG. 4), e.g., such as an upchirp CSS signal to backscatter nodes or tags and to UEs/assets, to localize (e.g., to cause the backscatter nodes or tags and UEs to perform a positioning procedure to allow the location of the UE(s) to be determined based on phase information and frequency offsets of received backscatter signals).

Example 23. The method of any of examples 21-22, wherein the configuration information comprises a location measurement configuration indicating: a location of each of the backscatter nodes; a different backscatter node-specific frequency offset assigned to each of the plurality of backscatter nodes; and an indication of a positioning procedure or one or more parameters for the positioning procedure, to be used by the user device to determine a location of the user device (FIGS. 3A, 3B, configuration information may include a location of each of the backscatter nodes, and a frequency offset assigned to each backscatter node).

Example 24. The method of any of examples 21-23, wherein the controlling transmitting, by the network node, a signal to at least some of the plurality of backscatter nodes comprises controlling transmitting at least one of the following: an orthogonal frequency division multiplexing (OFDM) signal; or a chirp spread spectrum signal, including at least one of a downchirp signal or an upchirp signal (e.g., FIGS. 9A and 9B are diagrams illustrating an example transmission of chirp spread spectrum signals (CSS), and example correlation results of the CSS signals at a receiver. As shown in FIG. 9A, an initial CSS signal may be transmitted at frequency f0 by gNB 414 (or BS or network node; see FIGS. 4, 8). A chirp spread spectrum signal has a linearly changing (e.g., increasing or decreasing) frequency over a bandwidth (BW), e.g., from −BW/2 to BW/2. The CSS signal may be an upchirp CSS, with a linearly increasing frequency over a time period, or a downchirp CSS signal with a linearly decreasing frequency over a time period).

Example 25. A non-transitory computer-readable storage medium comprising instructions stored thereon that, when executed by at least one processor, are configured to cause a computing system to perform the method of any of examples 21-24.

Example 26. An apparatus comprising means for performing the method of any of examples 21-24.

Example 27. An apparatus comprising: at least one processor; and at least one memory including computer program code; the at least one memory and the computer program code configured to, with the at least one processor, cause the apparatus at least to perform the method of any of examples 21-24.

Example 28. An apparatus comprising: at least one processor; and at least one memory including computer program code; the at least one memory and the computer program code configured to, with the at least one processor, cause the apparatus at least to: control transmitting, by a network node to a plurality of backscatter nodes, the locations of which are known, configuration information comprising backscatter node-specific frequency offsets for the plurality of backscatter nodes, wherein each of the backscatter nodes is identifiable by a backscatter node-specific frequency offset; control receiving, by the network node from a positioning control entity, a location request for one or more user devices; control transmitting, by the network node, a signal to at least some of the plurality of backscatter nodes for the signal to be frequency shifted by a backscatter node-frequency offset according to the configuration information and transmitted by the at least some of the plurality of backscatter nodes to one or more user devices; control receiving, by the network node from a user device: the phase information and the frequency offset for each of the received frequency-shifted signals, for a positioning control entity to carry out the locating of the user device based on the phase information, the frequency offset for each of the received frequency-shifted signals and locations of the plurality of backscatter nodes known by the positioning control entity; or a location of the user device that is determined, by the user device, based on the phase information, the frequency offset for each of the received frequency-shifted signals and locations of the plurality of backscatter nodes known by the user device; and control transmitting, by the network node to the positioning control entity, at least one of the following: the phase information and the frequency offset, received by the network node and determined by the user device, for each of the plurality of received frequency-shifted signals; or the location of the user device, received by the network node and determined by the user device based on the phase information and frequency offset of the plurality of received backscatter signals and locations of the backscatter nodes known by the user device.

Figure 12:
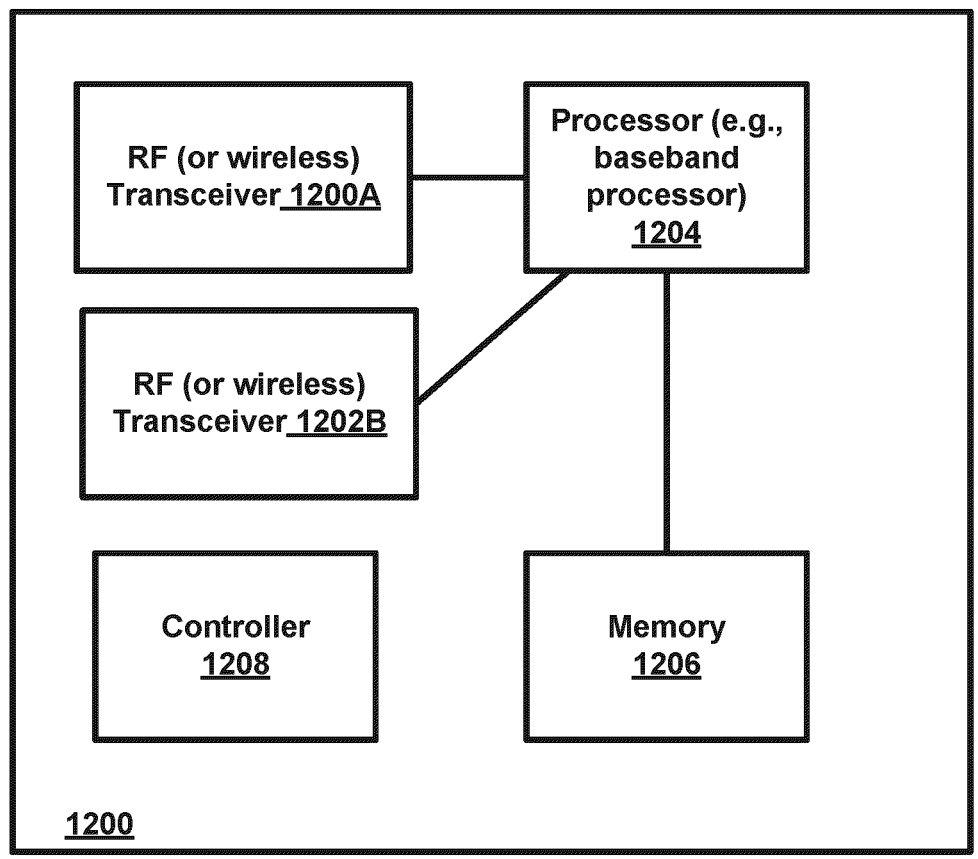
FIG. 12 is a block diagram of a wireless station or node (e.g., AP, BS, RAN node, DU UE or user device, or network node).

FIG. 12 is a block diagram of a wireless station (e.g., AP, BS or user device/UE, or other network node) 1200 according to an example embodiment. The wireless station 1200 may include, for example, one or more (e.g., two as shown in FIG. 12) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 12, a controller (or processor) 1208 may execute software and instructions, and may provide overall control for the station 1200, and may provide control for other systems not shown in FIG. 12, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G may be similar to that of LTE-advanced. 5G is likely to use multiple input-multiple output (MIMO) antennas, many more base stations or nodes than LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node may be operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a standalone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a backend component, e.g., as a data server, or that includes a middleware component, e.g., an application server, or that includes a frontend component, e.g., a client computer having a graphical user interface or a Web browser through which a user can interact with an embodiment, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A system comprising:
   a plurality of backscatter nodes, wherein each of the plurality of backscatter nodes comprises a backscatter transmitter including an antenna, a radio frequency (RF) switch, and two impedance loads toggled by a microcontroller unit to approximate a sinusoidal reflection coefficient, each of the plurality of backscatter nodes being assigned a distinct backscatter node-specific frequency offset of 50 kilohertz relative to a base frequency (f0) of an initial chirp spread spectrum (CSS) signal transmitted by a fifth generation (5G) next generation NodeB (gNB), and wherein each of the plurality of backscatter nodes is identifiable by the assigned backscatter node-specific frequency offset according to configuration information received in a wake-up packet transmitted by the gNB using on-off keying (OOK) modulation; and
   user equipment comprising:
      a backscatter receiver co-located with an asset;
      at least one processor; and
      at least one memory including computer-executable instructions that, when executed by the at least one processor, cause the apparatus to perform the following operations:
         controlling receiving a plurality of frequency-shifted CSS upchirp signals from the plurality of backscatter nodes;
         determining, for each of at least three of the received frequency-shifted CSS signals, correlation peaks obtained by correlating with an inverted CSS downchirp;
         determining, from the correlation peaks, both a phase and the corresponding frequency offset, wherein the correlation is performed separately for each antenna element of a user equipment antenna array, and wherein signals for which the correlation peak amplitude does not exceed a predefined threshold are disregarded;

controlling transmitting, in radio resource control (RRC) connected mode via a physical uplink shared channel (PUSCH) to the gNB that provided the configuration information, the phase information, and the frequency offset for each of the at least three received frequency-shifted CSS signals for a location management function (LMF) to determine the location of the user equipment using a direction-of-arrival based trilateration algorithm; and determining a location of the user device based on the phase information, the frequency offset for each of the at least three received frequency-shifted CSS signals and locations of the plurality of backscatter nodes known by the user device.

2. The system of claim 1, wherein the wake-up packet transmitted by the 5G gNB comprises a preamble, a start frame delimiter, a backscatter node identifier, and the assigned frequency offset, and further includes a frame check sequence for error detection.

3. The system of claim 2, wherein the plurality of backscatter nodes are geographically distributed anchor nodes located at known positions within a cell coverage area, and wherein the LMF maintains both the position coordinates and the assigned frequency offsets as unique identifiers of the backscatter nodes.

4. The system of claim 3, wherein the user equipment employs discontinuous reception (DRX) in a RRC idle or inactive state and transitions from the idle or the inactive state to a connected state in response to receiving a multiplexed secondary synchronization signal (SSS)-only wake-up signal from the gNB.

5. The system of claim 4, wherein the correlation performed by the user equipment comprises correlating each received frequency-shifted CSS upchirp with an inverted downchirp to obtain correlation peaks, and wherein carrier frequency offset correction is applied prior to estimating the phase information.

6. The system of claim 5, wherein the location determined by the LMF is transmitted to an asset management database and is based on trilateration using at least three direction-of-arrival measurements derived from the correlation peaks.

7. The system of claim 6, wherein each backscatter transmitter of the plurality of backscatter nodes is configured to alternate between absorbing and reflecting states by toggling the radio frequency (RF) switch between the two impedance loads, and wherein the toggling frequency determines the assigned 50 kilohertz frequency offset.

8. The system of claim 7, wherein the CSS signal transmitted by the 5G gNB has a bandwidth of 500 kilohertz and each of the plurality of backscatter nodes shifts the CSS signal by an integer multiple of 50 kilohertz relative to the base frequency (f0).

9. The system of claim 8, wherein the user equipment transmits, via the PUSCH, a message that includes both the correlation peak amplitudes and the corresponding phase values for the received frequency-shifted CSS signals.

10. The system of claim 9, wherein the backscatter receiver co-located with the asset comprises an impedance matching circuit, an envelope detector, a low-power comparator, and a preamble detector configured to detect an OOK modulated wake-up signal.

11. A method comprising:
assigning, to each of a plurality of backscatter nodes, a distinct backscatter node-specific frequency offset of 50 kilohertz relative to a base frequency (f0) of an initial chirp spread spectrum (CSS) signal transmitted by a fifth generation (5G) next generation NodeB (gNB);

receiving, by each of the plurality of backscatter nodes, configuration information in a wake-up packet transmitted by the gNB using on-off keying (OOK) modulation, the wake-up packet specifying the assigned frequency offset;

reflecting, by each of the plurality of backscatter nodes, the CSS signal using a backscatter transmitter including an antenna, a radio frequency (RF) switch, and two impedance loads toggled by a microcontroller unit to approximate a sinusoidal reflection coefficient, wherein each reflected CSS signal is shifted by the assigned frequency offset; controlling, by user equipment including a backscatter receiver co-located with an asset, receiving a plurality of the reflected frequency-shifted CSS upchirp signals from the plurality of backscatter nodes;

determining, for each of at least three of the received frequency-shifted CSS signals, correlation peaks obtained by correlating with an inverted CSS downchirp;

determining, from the correlation peaks, both a phase and the corresponding frequency offset, wherein the correlation is performed separately for each antenna element of a user equipment antenna array, and wherein signals for which the correlation peak amplitude does not exceed a predefined threshold are disregarded;

controlling transmitting, in radio resource control (RRC) connected mode via a physical uplink shared channel (PUSCH) to the gNB that provided the configuration information, the phase information and the frequency offset for each of the at least three received frequency-shifted CSS signals for a location management function (LMF) to determine the location of the user equipment using a direction-of-arrival based trilateration algorithm; and determining a location of the user equipment based on the phase information, the frequency offset for each of the at least three received frequency-shifted CSS signals, and locations of the plurality of backscatter nodes known by the user equipment.

12. The method of claim 11, wherein the wake-up packet transmitted by the 5G gNB comprises a preamble, a start frame delimiter, a backscatter node identifier, and the assigned frequency offset, and further includes a frame check sequence for error detection.

13. The method of claim 12, further comprising geographically distributing the plurality of backscatter nodes as anchor nodes located at known positions within a cell coverage area, wherein the LMF maintains both the position coordinates and the assigned frequency offsets as unique identifiers of the backscatter nodes.

14. The method of claim 13, further comprising employing, by the user equipment, discontinuous reception (DRX) in a RRC idle or inactive state and transitioning from the idle or inactive state to a connected state in response to receiving a multiplexed secondary synchronization signal (SSS)-only wake-up signal from the gNB.

15. The method of claim 14, wherein determining the correlation peaks comprises correlating each received frequency-shifted CSS upchirp with an inverted downchirp to obtain correlation peaks, and further comprises applying carrier frequency offset correction prior to estimating the phase information.

16. The method of claim 15, further comprising transmitting, by the LMF to an asset management database, a location determined based on trilateration using at least three direction-of-arrival measurements derived from the correlation peaks.

17. The method of claim 16, wherein reflecting the CSS signal by each of the plurality of backscatter nodes comprises alternating between absorbing and reflecting states by toggling the RF switch between the two impedance loads, and wherein the toggling frequency determines the assigned 50 kilohertz frequency offset.

18. The method of claim 17, wherein transmitting the CSS signal by the gNB comprises transmitting with a bandwidth of 500 kilohertz, and wherein each of the plurality of backscatter nodes shifts the CSS signal by an integer multiple of 50 kilohertz relative to the base frequency ($f0$).

19. The method of claim 18, further comprising transmitting, by the user equipment via the PUSCH, a message that includes both the correlation peak amplitudes and the corresponding phase values for the received frequency-shifted CSS signals.

20. The method of claim 19, wherein receiving the wake-up packet by the backscatter receiver comprises detecting, by an impedance matching circuit, an envelope detector, a low-power comparator, and a preamble detector, the OOK modulated wake-up signal.

\* \* \* \* \*